United States Patent
Higuchi et al.

(10) Patent No.: US 10,550,793 B2
(45) Date of Patent: Feb. 4, 2020

(54) FUEL INJECTION CONTROL DEVICE AND METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Akihiko Higuchi, Toyota (JP); Tomohiro Nakano, Nagoya (JP); Eiji Murase, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 15/637,050

(22) Filed: Jun. 29, 2017

(65) Prior Publication Data

US 2018/0030919 A1    Feb. 1, 2018

(30) Foreign Application Priority Data

Jul. 27, 2016    (JP) ................................ 2016-147260

(51) Int. Cl.
  *F02D 41/40*    (2006.01)
  *F02D 41/00*    (2006.01)
  *F02D 41/30*    (2006.01)
  *F02D 41/38*    (2006.01)

(52) U.S. Cl.
  CPC ......... *F02D 41/402* (2013.01); *F02D 41/008* (2013.01); *F02D 41/3023* (2013.01); *F02D 2041/389* (2013.01); *F02D 2200/063* (2013.01); *F02D 2200/0614* (2013.01); *Y02T 10/44* (2013.01)

(58) Field of Classification Search
  CPC .................................................. F02D 2200/063
  See application file for complete search history.

(56) References Cited

U.S. PATENT DOCUMENTS

| | | | |
|---|---|---|---|
| 9,388,760 B2 * | 7/2016 | Katsurahara | F02D 41/247 |
| 9,631,593 B2 * | 4/2017 | Nakajima | F02M 51/061 |
| 9,765,722 B2 * | 9/2017 | Higuchi | F02D 41/3094 |
| 9,797,332 B2 * | 10/2017 | Nakano | F02D 41/2467 |
| 9,890,729 B2 * | 2/2018 | Tanaka | F02D 41/247 |

(Continued)

FOREIGN PATENT DOCUMENTS

| | | |
|---|---|---|
| EP | 2975244 A1 | 1/2016 |
| JP | 2003-343331 A | 12/2003 |
| JP | 2016-008569 A | 1/2016 |

*Primary Examiner* — Kevin R Steckbauer
(74) *Attorney, Agent, or Firm* — Oliff PLC

(57) ABSTRACT

A fuel injection control device divides an amount of fuel corresponding to an injection amount required for a single combustion into portions corresponding to multiple fuel injections, causes the direct injector to inject the fuel in the multiple times, and causes the direct injector to execute a partial-lift injection as a final fuel injection. The device includes a total injection amount calculation section, an individual injection amount calculation section, and an injection amount changing section. The injection amount changing section executes, as a first changing process, a process for increasing the injection amount at the final fuel injection to a value between a partial-lift injection lower limit value and a partial-lift injection upper limit value and reducing the injection amount at a fuel injection other than the final fuel injection by the increased amount of the injection amount at the final fuel injection.

5 Claims, 14 Drawing Sheets

(56) References Cited

U.S. PATENT DOCUMENTS

| | | | |
|---|---|---|---|
| 9,920,702 B2* | 3/2018 | Katsurahara | F02D 41/20 |
| 9,920,704 B2* | 3/2018 | Katsurahara | F02D 41/20 |
| 10,012,168 B2* | 7/2018 | Nakano | F02D 41/222 |
| 10,072,596 B2* | 9/2018 | Dames | F02D 41/40 |
| 10,125,730 B2* | 11/2018 | Yanoto | F02D 41/20 |
| 2003/0217734 A1* | 11/2003 | Ito | F02D 41/403 |
| | | | 123/299 |
| 2014/0311459 A1* | 10/2014 | Katsurahara | F02D 41/247 |
| | | | 123/478 |
| 2015/0369158 A1* | 12/2015 | Nakajima | F02M 51/061 |
| | | | 123/294 |
| 2015/0369161 A1* | 12/2015 | Nakano | F02D 41/402 |
| | | | 123/480 |
| 2015/0377172 A1* | 12/2015 | Higuchi | F02D 41/3094 |
| | | | 123/472 |
| 2016/0208730 A1* | 7/2016 | Uchida | F02D 41/401 |
| 2016/0237935 A1* | 8/2016 | Tanaka | F02D 41/247 |
| 2016/0252035 A1* | 9/2016 | Katsurahara | F02D 41/20 |
| | | | 123/478 |
| 2016/0252037 A1* | 9/2016 | Katsurahara | F02D 41/20 |
| | | | 123/480 |
| 2016/0281624 A1* | 9/2016 | Dames | F02D 41/40 |
| 2016/0312735 A1* | 10/2016 | Nakano | F02D 41/2467 |
| 2016/0348604 A1* | 12/2016 | Higuchi | F02D 41/024 |
| 2016/0363078 A1* | 12/2016 | Nakano | F02D 41/222 |
| 2017/0002765 A1* | 1/2017 | Nakano | F02D 41/34 |
| 2017/0145943 A1* | 5/2017 | Mitani | F02D 41/3023 |
| 2017/0175653 A1* | 6/2017 | Uchida | F02D 41/40 |
| 2017/0226950 A1* | 8/2017 | Tanaka | F02D 41/20 |
| 2018/0149124 A1* | 5/2018 | Yanoto | F02D 41/20 |
| 2018/0209370 A1* | 7/2018 | Moriyama | F02D 45/00 |
| 2018/0223766 A1* | 8/2018 | Nakano | F02D 41/20 |
| 2018/0230931 A1* | 8/2018 | Imai | F02D 41/40 |

* cited by examiner

FUEL INJECTION CONTROL DEVICE AND METHOD FOR INTERNAL COMBUSTION ENGINE

BACKGROUND OF THE INVENTION

The present invention relates to a fuel injection control device and method for an internal combustion engine.

Japanese Laid-Open Patent Publication No. 2016-8569 discloses a fuel injection control device employed in an internal combustion engine configured to execute a full-lift injection, in which the needle valve of the direct injector that injects fuel is fully opened, and a partial-lift injection (an intermediate-lift injection), in which the needle valve of the direct injector is not fully opened. This fuel injection control device divides the amount of fuel corresponding to the injection amount required for a single combustion into portions corresponding to multiple fuel injections, and causes the direct injector to inject the fuel in the multiple times. In addition, the fuel injection control device causes the direct injector to execute the partial-lift injection as the final fuel injection of the multiple fuel injections.

In the above-described technique, the final fuel injection of the multiple fuel injections is executed for the purpose of stratifying fuel to form, in the vicinity of the spark plug, a fuel stratum that is richer than the other regions. For this reason, if the injection amount at the final fuel injection varies, the combustion state tends to vary for each cylinder and each combustion. Therefore, it is desired that the final fuel injection of multiple fuel injections be executed with an accurate injection amount with small variation.

Depending on the method of calculating the injection amount by the fuel injection control device, a small injection amount may be calculated as the injection amount at the final fuel injection of the above-described multiple fuel injections. Since the position of the needle valve is unstable in the fuel injection of the partial-lift injection as compared with the case of the full-lift injection, the smaller the injection amount, the greater the variation in the injection amount becomes. Therefore, if an excessively small injection amount is set as the execution value of the injection amount at the final fuel injection, there may be variation in the combustion state for each cylinder and each combustion.

SUMMARY OF THE INVENTION

In accordance with a first aspect of the present invention, a fuel injection control device adapted to an internal combustion engine is provided. The internal combustion engine is configured to execute a full-lift injection, in which a needle valve of a direct injector that injects fuel is fully opened, and a partial-lift injection, in which the needle valve of the direct injector is not fully opened. The fuel injection control device is configured to divide an amount of fuel corresponding to an injection amount required for a single combustion into portions corresponding to multiple fuel injections, cause the direct injector to inject the fuel in the multiple times, and cause the direct injector to execute the partial-lift injection as a final fuel injection of the multiple fuel injections. The fuel injection control device includes a total injection amount calculation section, an individual injection amount calculation section, and an injection amount changing section. The total injection amount calculation section is configured to calculate a total amount of injection amounts at the multiple fuel injections as a total injection amount. The individual injection amount calculation section is configured to calculate the injection amount at each fuel injection such that a sum of the injection amounts at the multiple fuel injections is equal to the total injection amount calculated by the total injection amount calculation section. The injection amount changing section is configured to execute a first changing process when the injection amount at the final fuel injection of the multiple fuel injections is less than a predetermined partial-lift injection lower limit value. The injection amount changing section is configured to execute, as the first changing process, a process for increasing the injection amount at the final fuel injection to a value that is not less than the partial-lift injection lower limit value and not greater than a partial-lift injection upper limit value, which is set to be greater than the partial-lift injection lower limit value, and reducing the injection amount at a fuel injection other than the final fuel injection of the multiple fuel injections by the increased amount of the injection amount at the final fuel injection.

With the above-described configuration, even if an injection amount less than the partial-lift injection lower limit value is calculated as the injection amount at the final fuel injection of the multiple fuel injections, the calculated injection amount is changed to a value not less than the partial-lift injection lower limit value. Therefore, the final fuel injection will not be executed with an excessively small injection amount that is less than the partial-lift injection lower limit value. As a result, it is possible to suppress variation in the injection amount at the final fuel injection, and variation in the combustion state for each cylinder and each combustion.

The fuel injection control device may be configured to cause the direct injector to execute the full-lift injection as an initial fuel injection of the multiple fuel injections. The injection amount changing section may be configured to execute, in the first changing process, a process for reducing an injection amount at the initial fuel injection by the increased amount at the final fuel injection.

With the above-described configuration, the initial fuel injection is a full-lift injection for distributing the fuel to the entire cylinder. In the full-lift injection, the injection amount does not need to be as precise as that in the final fuel injection. Therefore, reduction in the injection amount at the initial fuel injection is unlikely to exert any adverse effects on the combustion state in the cylinder.

The injection amount changing section may be configured to execute, in the first changing process, a process for increasing the injection amount at the final fuel injection, which is calculated by the individual injection amount calculation section, to a value equal to the partial-lift injection lower limit value.

With the above-described configuration, the amount of change in the injection amount is minimized when changing the injection amount at the final fuel injection to an injection amount that is not less than the partial-lift injection lower limit value. This minimizes change in the stratification state of fuel in the cylinder in the vicinity of the spark plug due to the change in the injection amount at the final fuel injection.

Among the multiple fuel injections, a fuel injection other than the final fuel injection and the initial fuel injection may be defined as a specific fuel injection. The injection amount changing section may be configured to execute a second changing process when the injection amount at the initial fuel injection of the multiple fuel injections, which are calculated by the individual injection amount calculation section, is not less than a full-lift injection lower limit value, which is set to be greater than the partial-lift injection upper limit value, and an injection amount at the specific fuel injection of the injection amounts at the fuel injections, which are calculated by the individual injection amount calculation section, is greater than the partial-lift injection upper limit value and less than the full-lift injection lower limit value. The injection amount changing section may be configured to execute, as the second changing process, a process for increasing the injection amount at the specific fuel injection to a value that is not less than the full-lift injection lower limit value and reduce the injection amount at the initial fuel injection by the increased amount of the injection amount at the specific fuel injection.

The smaller the injection amount, the greater the variation tends to be not only at the fuel injection of the partial-lift injection, but also at the fuel injection of the full-flit injection. In this regard, with the above-described configuration, even if the injection amount at the specific fuel injection, which is calculated by the individual injection amount calculation section, is less than the full-lift injection lower limit value, that injection amount is increased to an injection amount not less than the full-lift injection lower limit value by the injection amount changing section. Therefore, the specific fuel injection will not be executed with an injection amount less than the full-lift injection lower limit value, which is excessively small for the fuel injection of the full-lift injection. The initial fuel injection is an injection for distributing the fuel to the entire cylinder and does not need to be as precise as that in the subsequent fuel injections. Therefore, reduction in the injection amount at the initial fuel injection is unlikely to exert any adverse effects on the combustion state in the cylinder.

Among the multiple fuel injections, a fuel injection other than the final fuel injection and the initial fuel injection may be defined as a specific fuel injection. The injection amount changing section may be configured to execute a third changing process when the injection amount at the initial fuel injection of the multiple fuel injections, which are calculated by the individual injection amount calculation section, is not less than a full-lift injection lower limit value, which is set to be greater than the partial-lift injection upper limit value, and an injection amount at the specific fuel injection of the injection amounts at the fuel injections, which are calculated by the individual injection amount calculation section, is greater than the partial-lift injection upper limit value and less than the full-lift injection lower limit value. The injection amount changing section may be configured to execute, as the third changing process, a process for reducing the injection amount at the specific fuel injection to 0 and increase the injection amount at the initial fuel injection by the reduced amount of the injection amount at the specific fuel injection.

With the above-described configuration, when the injection amount at the specific fuel injection, which is calculated by the individual injection amount calculation section, is greater than the partial-lift injection upper limit value and is less than the full-lift injection lower limit value, the injection amount at the specific fuel injection is reduced to 0. That is, the specific fuel injection is omitted and the total number of fuel injections is reduced by one. Therefore, the specific fuel injection will not be executed with a greatly varied injection amount. When this process is executed, it is possible to properly form, in the vicinity of the spark plug, a fuel stratum richer than the other regions in the final fuel injection, while ensuring that most of the entire injection amount is injected at the initial fuel injection. Therefore, the omission of the specific fuel injection is unlikely to exert any adverse effects on the combustion state in the cylinder.

Among the multiple fuel injections, a fuel injection other than the final fuel injection and the initial fuel injection may be defined as a specific fuel injection. The injection amount changing section may be configured to execute a fourth changing process when the injection amount at the initial fuel injection of the multiple fuel injections, which are calculated by the individual injection amount calculation section, is not less than a full-lift injection lower limit value, which is set to be greater than the partial-lift injection upper limit value, and an injection amount at the specific fuel injection of the injection amounts at the fuel injections, which are calculated by the individual injection amount calculation section, is greater than the partial-lift injection upper limit value and less than the full-lift injection lower limit value. The injection amount changing section may be configured to execute, as the fourth changing process, a process for reducing the injection amount at the specific fuel injection to a value that is not less than the partial-lift injection lower limit value and not greater than the partial-lift injection upper limit value and increase the injection amount at the initial fuel injection by the reduced amount of the injection amount at the specific fuel injection.

With the above-described configuration, when the injection amount at the specific fuel injection, which is calculated by the individual injection amount calculation section, is greater than the partial-lift injection upper limit value and is less than the full-lift injection lower limit value, the injection amount is reduced such that the specific fuel injection will be executed by the partial-lift injection. As described above, rather than executing the specific fuel injection by the full-lift injection with a greatly varied injection amount, execution of the injection by the partial-lift injection reduces the variation in the injection amount at the specific fuel injection even though the injection amount is reduced to some extent.

In accordance with a second aspect of the present invention, a fuel injection control method adapted to an internal combustion engine is provided. The internal combustion engine is configured to execute a full-lift injection, in which a needle valve of a direct injector that injects fuel is fully opened, and a partial-lift injection, in which the needle valve of the direct injector is not fully opened. The fuel injection control method divides an amount of fuel corresponding to an injection amount required for a single combustion into portions corresponding to multiple fuel injections, causes the direct injector to inject the fuel in the multiple times, and causes the direct injector to execute the partial-lift injection as a final fuel injection of the multiple fuel injections. The fuel injection control method includes: calculating a total amount of injection amounts at the multiple fuel injections as a total injection amount; calculating the injection amount at each fuel injection such that a sum of the injection amounts at the multiple fuel injections is equal to the calculated total injection amount; and executing a first changing process when the injection amount at the final fuel injection of the multiple fuel injections is less than a predetermined partial-lift injection lower limit value. The first changing process includes: increasing the injection amount at the final fuel injection to a value that is not less than the partial-lift injection lower limit value and not greater than a partial-lift injection upper limit value, which is set to be greater than the partial-lift injection lower limit value; and reducing the injection amount at a fuel injection other than the final fuel injection of the multiple fuel injections by the increased amount of the injection amount at the final fuel injection.

In accordance with a third aspect of the present invention, a fuel injection control device adapted to an internal combustion engine is provided. The internal combustion engine is configured to execute a full-lift injection, in which a needle valve of a direct injector that injects fuel is fully opened, and a partial-lift injection, in which the needle valve of the direct injector is not fully opened. The fuel injection control device includes circuitry, which is configured to divide an amount of fuel corresponding to an injection amount required for a single combustion into portions corresponding to multiple fuel injections, cause the direct injector to inject the fuel in the multiple times, and cause the direct injector to execute the partial-lift injection as a final fuel injection of the multiple fuel injections. The circuitry is configured to: calculate a total amount of injection amounts at the multiple fuel injections as a total injection amount; calculate the injection amount at each fuel injection such that a sum of the injection amounts at the multiple fuel injections is equal to the calculated total injection amount; and execute a first changing process when the injection amount at the final fuel injection of the multiple fuel injections is less than a predetermined partial-lift injection lower limit value. The circuitry is configured to, as the first changing process: increase the injection amount at the final fuel injection to a value that is not less than the partial-lift injection lower limit value and not greater than a partial-lift injection upper limit value, which is set to be greater than the partial-lift injection lower limit value; and reduce the injection amount at a fuel injection other than the final fuel injection of the multiple fuel injections by the increased amount of the injection amount at the final fuel injection.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

A fuel injection control device 50 according to one embodiment of the present invention will now be described with reference to the drawings. The fuel injection control device 50 is used in an internal combustion engine 10. First, a schematic configuration of the internal combustion engine 10 will be described.

Figure 1:
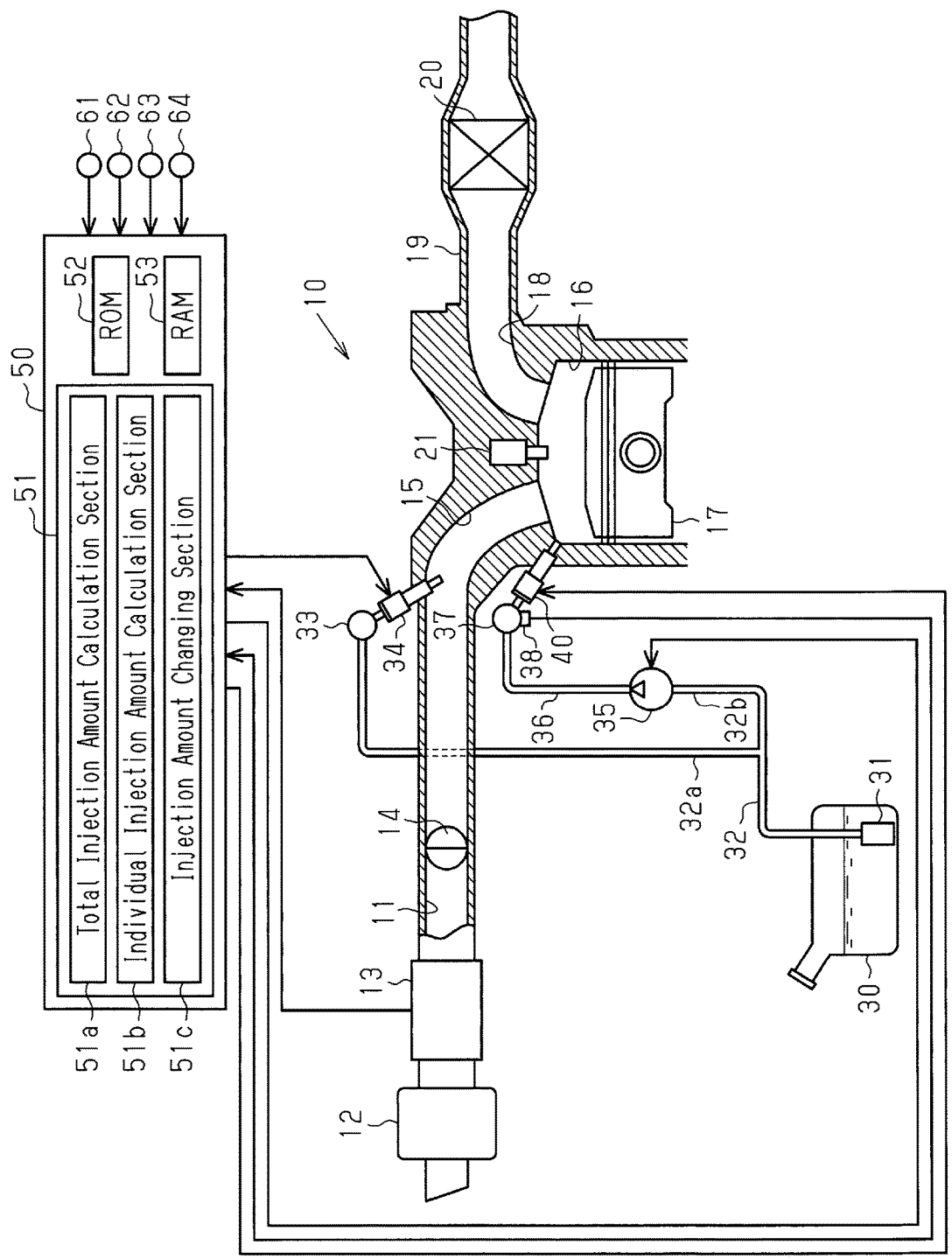
FIG. 1 is a schematic diagram of the configuration of an internal combustion engine and a fuel injection control device.

As shown in FIG. 1, an intake passage 11 of the internal combustion engine 10 includes an air cleaner 12 for filtering out foreign substances such as dust in intake air flowing into the intake passage 11. The intake passage 11 also includes an air flow meter 13 located downstream of the air cleaner 12. The air flow meter 13 detects the flow rate of intake air. The air flow meter 13 outputs the detected flow rate value of intake air to the fuel injection control device 50. A throttle valve 14 is provided in the intake passage 11 at a position downstream of the air flow meter 13. The throttle valve 14 regulates the amount of intake air by changing the valve opening degree.

A section of the intake passage 11 that is downstream of the throttle valve is connected to cylinders 16 via intake ports 15. Each cylinder 16 incorporates a piston 17, which reciprocates in the cylinder 16. The cylinders 16 are connected to an exhaust passage 19 via exhaust ports 18. An exhaust purification catalyst 20 for purifying nitrogen oxides, carbon monoxide and hydrocarbons in the exhaust gas is provided in the exhaust passage 19. In each cylinder 16, an ignition plug 21 for igniting fuel is provided between the intake port 15 and the exhaust port 18. Although the internal combustion engine 10 includes a plurality of cylinders 16 and a plurality of sets of intake ports 15 and exhaust ports 18 connected to the cylinders 16, FIG. 1 illustrates one of the cylinders 16 and one set of the intake port 15 and the exhaust port 18 connected to the cylinder 16.

Fuel is supplied to each cylinder 16 of the internal combustion engine 10 from a fuel tank 30, which stores fuel. The fuel tank 30 incorporates a feed pump 31, which pumps out and discharges fuel from the fuel tank 30 to a low-pressure fuel passage 32. The low-pressure fuel passage 32 branches into a first branch passage 32a and a second branch passage 32b in the middle. The first branch passage 32a is connected to a low-pressure fuel pipe 33. The low-pressure fuel pipe 33 is provided with a port injector 34, which injects fuel supplied from the low-pressure fuel pipe 33. The port injector 34 is an electromagnetic valve that is opened and closed by the fuel injection control device 50 to inject a predetermined amount of fuel into the intake port 15 of the internal combustion engine 10.

A high-pressure fuel pump 35 is provided in the second branch passage 32b of the low-pressure fuel passage 32. The operation of the high-pressure fuel pump 35 is controlled by the fuel injection control device 50. The high-pressure fuel pump 35 further pressurizes the fuel discharged from the feed pump 31 to a predetermined pressure and discharges the fuel. The high-pressure fuel pump 35 is connected to a high-pressure fuel pipe 37 via a high-pressure fuel passage 36. The high-pressure fuel pipe 37 is provided with a direct injector 40, which injects fuel supplied from the high-pressure fuel pipe 37. The direct injector 40 is an electromagnetic valve that is opened and closed by the fuel injection control device 50 to inject a predetermined amount of fuel into the cylinder 16 of the internal combustion engine 10. A fuel pressure sensor 38 for detecting the pressure of the fuel supplied to the direct injector 40 is provided in the high-pressure fuel pipe 37. The fuel pressure sensor 38 outputs a fuel pressure value of the high-pressure fuel pipe 37 to the fuel injection control device 50.

Next, a specific configuration of the direct injector 40 will be described.

Figure 2:
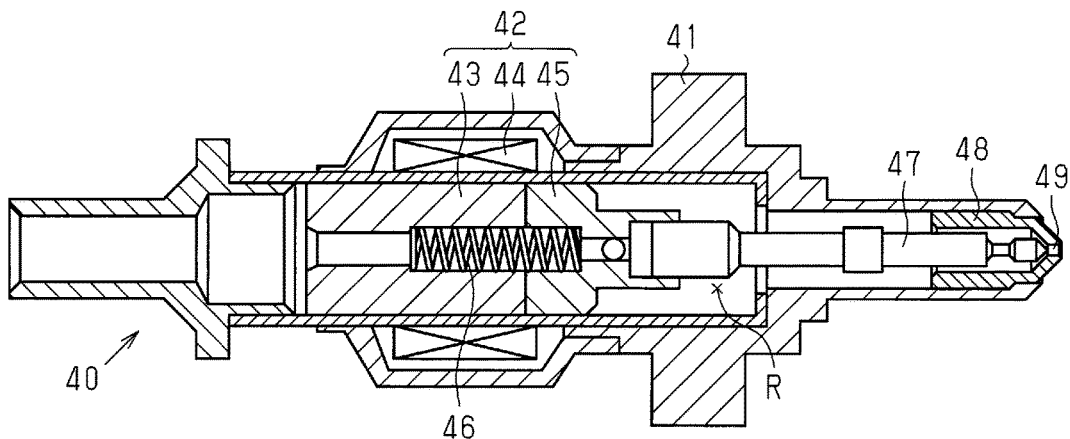
FIG. 2 is a cross-sectional view of the direct injector.

As shown in FIG. 2, the direct injector 40 has a housing 41, which has a cylindrical shape as a whole. The housing 41 incorporates an electromagnetic solenoid 42. The electromagnetic solenoid 42 includes a stationary core 43 fixed to the housing 41, an electromagnetic coil 44 provided around the stationary core 43, and a movable core 45 arranged closer to the distal end of the direct injector 40 (the right side as viewed in FIG. 2) than the stationary core 43. The movable core 45 is provided inside the housing 41 so as to be displaceable in the axial direction (left-right direction in FIG. 2) of the housing 41.

The housing 41 also incorporates a spring 46, which extends in the axial direction of the housing 41 and is arranged between the stationary core 43 and the movable core 45. The spring 46 is supported by the stationary core 43 and urges the movable core 45 toward the distal end. A gap is provided in the housing 41 at a position closer to the distal than the movable core 45. The gap functions as a fuel chamber R, to which fuel is supplied from the high-pressure fuel pipe 37 described above.

A needle valve 47, which is integrally displaced with the movable core 45, is fixed to the distal end of the movable core 45. The needle valve 47 is in the form of a needle extending in the axial direction of the housing 41 as a whole. A nozzle body 48 surrounding the distal portion of the needle valve 47 is attached to a distal portion inside the housing 41. The nozzle body 48 has at the distal end a nozzle hole 49, which connects the inside and the outside of the housing 41 to each other.

In the direct injector 40, the needle valve 47 is urged toward the distal end of the housing 41 together with the movable core 45. When the electromagnetic coil 44 of the electromagnetic solenoid 42 is not energized, the distal end of the needle valve 47 is seated on the distal end of the nozzle body 48, so that the needle valve 47 closes the nozzle hole 49.

When energization of the electromagnetic coil 44 of the electromagnetic solenoid 42 is started, electromagnetic attraction force is generated between the stationary core 43 and the movable core 45, so that the movable core 45 is displaced toward the stationary core 43. Accordingly, the distal end of the needle valve 47 separates from the nozzle body 48 to open the nozzle hole 49. As a result, the direct injector 40 injects the fuel in the fuel chamber R to the outside of the housing 41 via the nozzle hole 49. The movable core 45 can be moved to a position where the movable core 45 contacts the stationary core 43. As shown in FIG. 2, when the movable core 45 and the stationary core 43 are in contact with each other, the needle valve 47 is fully opened.

Next, the relationship between the energization time of the electromagnetic coil 44 of the electromagnetic solenoid 42 and variation in the injection amount in the direct injector 40 configured as described above will now be described. In the following description, partial-lift injection is abbreviated as P/L, and full-lift injection is abbreviated as F/L in some cases.

Figure 3:
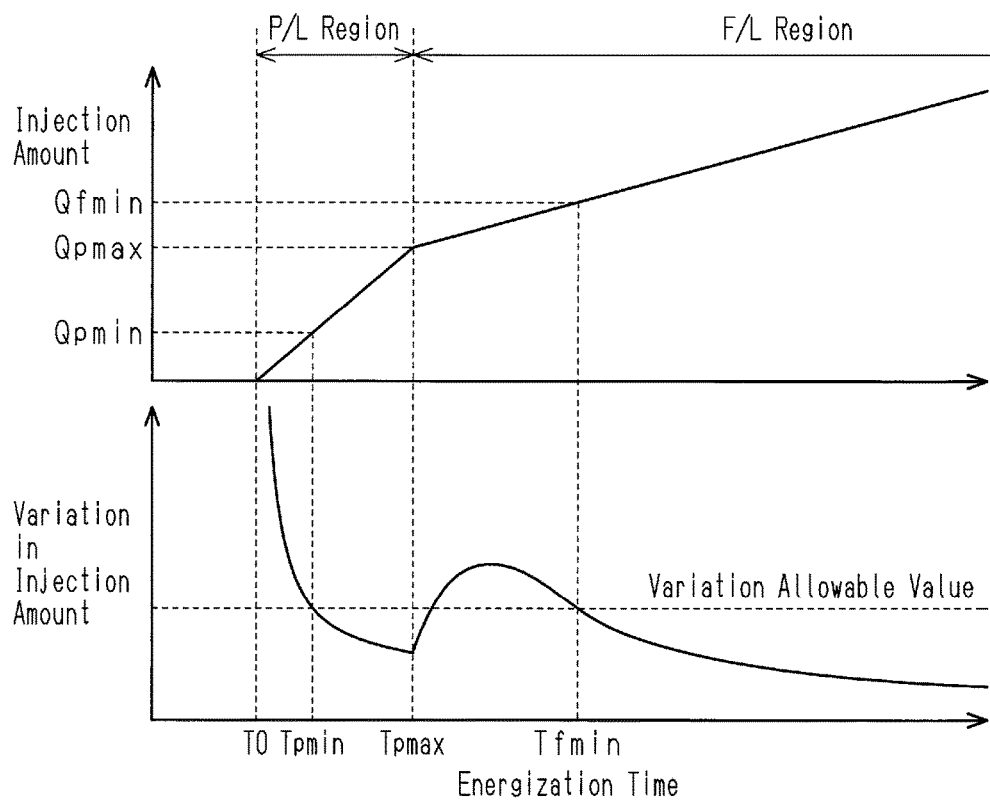
FIG. 3 is a graph showing the relationship of energization time with an injection amount and variation in the injection amount at a direct cylinder.

As shown in FIG. 3, the distal end of the needle valve 47 is seated on the nozzle body 48 until a certain period of time has elapsed from the start of energization of the electromagnetic coil 44 of the direct injector 40. Therefore, the injection amount from the direct injector 40 is 0. The needle valve 47 starts to separate from the nozzle body 48 at a lift starting time point T0, at which a certain period of time has elapsed from the start of energization of the electromagnetic coil 44 of the direct injector 40.

After the lift starting time point T0, the lift amount of the needle valve 47 increases as the energization time becomes longer. Then, immediately after P/L maximum injection amount time point Tpmax, the lift amount of the needle valve 47 becomes maximum. In other words, the needle valve 47 is fully opened. In the period from the lift starting time point T0 to the P/L maximum injection amount time point Tpmax, the injection amount of the direct injector 40 gradually increases in proportion to the energization time. In this period, since the lift amount of the needle valve 47 increases in proportion to the energization time, the change rate of the injection amount is relatively great. A period from the lift starting time point T0 to the P/L maximum injection amount time point is defined as a P/L region. If the energization ending time point is set to a time point in the P/L region, the direct injector 40 executes the partial-lift injection, in which the needle valve 47 does not reach the fully opened state.

In the period after the P/L maximum injection amount time point Tpmax, the lift amount of the needle valve 47 is held at the maximum and the needle valve 47 is kept fully opened. Therefore, in this period, the injection amount of the direct injector 40 gradually increases in proportion to the energization time. In this period, the lift amount of the needle valve 47 is constant except for the fluctuation due to the bounce motion of the needle valve 47, which will be discussed below. Therefore, the change rate of the injection amount is smaller than the change rate in the above-described P/L region. A period after the P/L maximum injection amount time point Tpmax is defined as an F/L region. If the energization ending time point is set to a time point in the F/L region, the direct injector 40 executes the full-lift injection, in which the needle valve 47 reaches the fully opened state.

There is a certain degree of variation in the time from the start of energization of the electromagnetic coil 44 of the direct injector 40 to the lift starting time point TO, at which the needle valve 47 separates from the nozzle body 48. Such variation is a cause of variation in the injection amount in the partial-lift injection. Further, in the partial-lift injection, the shorter the energization time, the greater becomes the ratio of variation in the injection amount to the entire injection amount. Therefore, in the partial-lift injection, variation in the injection amount increases as the energization time is shortened and the injection amount is reduced.

When the movable core 45 abuts against the stationary core 43 in the direct injector 40 to fully open the needle valve 47, the needle valve 47 bounces due to the reaction of the impact of the movable core 45 abutting against the stationary core 43. The minute vibration of the lift amount caused by such a bounce motion of the needle valve 47 causes variation in the injection amount in the full-lift injection. Further, in the full-lift injection, the shorter the energization time, the greater becomes the ratio of variation in the injection amount to the entire injection amount. Therefore, in the full-lift injection, variation in the injection amount tends to increase as the energization time is shortened and the injection amount is reduced.

In order to properly operate the internal combustion engine 10, it is preferable to keep the variation in the fuel injection amount for each cylinder 16 and each combustion in each cylinder 16 within a certain allowable value. As shown in FIG. 3, a predetermined variation allowable value is defined. In the P/L region, it is only necessary to energize the electromagnetic coil 44 of the direct injector 40 until an energization ending time point that is set in a period from the P/L minimum injection amount time point Tpmin to the P/L maximum injection amount time point Tpmax, in which variation in the injection amount is not greater than the variation allowable value. Here, the theoretical injection amount (the injection amount with zero variation) when the energization ending time point is set to the P/L minimum injection amount time point Tpmin is defined as a P/L lower limit value Qpmin, and theoretical injection amount (the injection amount with zero variation) when the energization ending time point is set to P/L maximum injection amount time point Tpmax is defined as a P/L upper limit value Qpmax. In this case, if the injection amount in the partial-lift injection is set to be not less than the P/L lower limit value Qpmin and not greater than the P/L upper limit value Qpmax, the variation in the injection amount is kept within the allowable value.

Likewise, with the predetermined variation allowable value defined, in the F/L region, it is only necessary to energize the electromagnetic coil 44 of the direct injector 40 at an energization ending time point that is set in a period in which the injection amount is not greater than the variation allowable value, that is, in a period after an F/L minimum injection amount time point Tfmin. Therefore, if the theoretical injection amount when the energization ending time point is the F/L minimum injection amount time point Tfmin (the injection amount with zero variation) is set to the F/L lower limit value Qfmin, setting the injection amount in the partial-lift injection to be not less than the F/L lower limit value Qfmin keeps the variation in the injection amount within the allowable value.

As shown in FIG. 1, the fuel injection by the direct injector 40 is controlled by the fuel injection control device 50. The fuel injection control device 50 is configured as a computer including a calculation section 51, a ROM 52, and a RAM 53. The calculation section 51 is configured to execute various programs. The ROM 52 stores data such as various programs and numerical values and arithmetic expressions used when executing the programs. The RAM 53 temporarily stores data at the time of executing various programs and the like. In the present embodiment, the fuel injection control device 50 is configured as an electronic control unit of the vehicle.

As described above, the fuel injection control device 50 receives the flow rate value of the intake air detected by the air flow meter 13 and the fuel pressure value of the high-pressure fuel pipe 37 detected by the fuel pressure sensor 38. A crank angle sensor 61 is connected to the fuel injection control device 50. The crank angle sensor 61 detects the rotational speed of the crankshaft, which rotates in accordance with reciprocations of the pistons 17. The fuel injection control device 50 receives a detection value from the crank angle sensor 61. The fuel injection control device 50 receives a coolant temperature value from a coolant temperature sensor 62, which detects the coolant temperature of the radiator, which cools the internal combustion engine 10. In addition, the fuel injection control device 50 receives a depression amount of the accelerator pedal from an accelerator pedal sensor 63, which detects the depression amount of the accelerator pedal. Further, the fuel injection control device 50 receives an outside air temperature value from an outside air temperature sensor 64, which detects the outside temperature of the vehicle. Based on these values, the fuel injection control device 50 calculates the injection amount of fuel to be injected from the direct injectors 40.

The calculation section 51 of the fuel injection control device 50 functions as a total injection amount calculation section 51a, which calculates, as a total injection amount Qt, the injection amount required for one combustion in each cylinder 16 based on various values input to the fuel injection control device 50 and on numerical values and arithmetic expressions stored in advance in the ROM 52. In the present embodiment, when the internal combustion engine 10 is in a specific operating state, for example, in a period from the beginning of the engine start to the completion of the warm-up, the fuel injection control device 50 divides the amount of fuel corresponding to the injection amount required for a single combustion into portions corresponding to three injections, and causes fuel to be injected in three injections. Therefore, the total injection amount calculation section 51a calculates the total injection amount at three fuel injections as the total injection amount Qt. In this embodiment, the first fuel injection corresponds to an initial fuel injection, the third fuel injection corresponds to a final fuel injection, and the second fuel injection corresponds to a specific fuel injection other than the final fuel injection and the initial fuel injection.

The calculation section 51 of the fuel injection control device 50 has a function as an individual injection amount calculation section 51b, which calculates injection amounts at each fuel injection as calculation values Q1, Q2, and Q3. The individual injection amount calculation section 51b calculates the calculation values Q1, Q2, and Q3 corresponding to the respective injections according to the arithmetic expressions stored in the ROM 52, such that the sum of the calculation values Q1, Q2, and Q3 is equal to the total injection amount Qt calculated by the total injection amount calculation section 51a. The calculation section 51 of the fuel injection control device 50 has a function as an injection amount changing section 51c, which changes calculation values Q1, Q2, and Q3 calculated by the individual injection amount calculation section 51b. When the calculation values Q1, Q2, and Q3 satisfy a specific condition, the injection amount changing section 51*c* executes a changing process for changing these calculation values Q1, Q2, and Q3.

Each process of the fuel injection control by the fuel injection control device 50 configured as described above will be described with reference to the flowcharts of FIGS. 4 to 8 and the explanatory diagrams of FIGS. 9 to 22.

Figure 4:
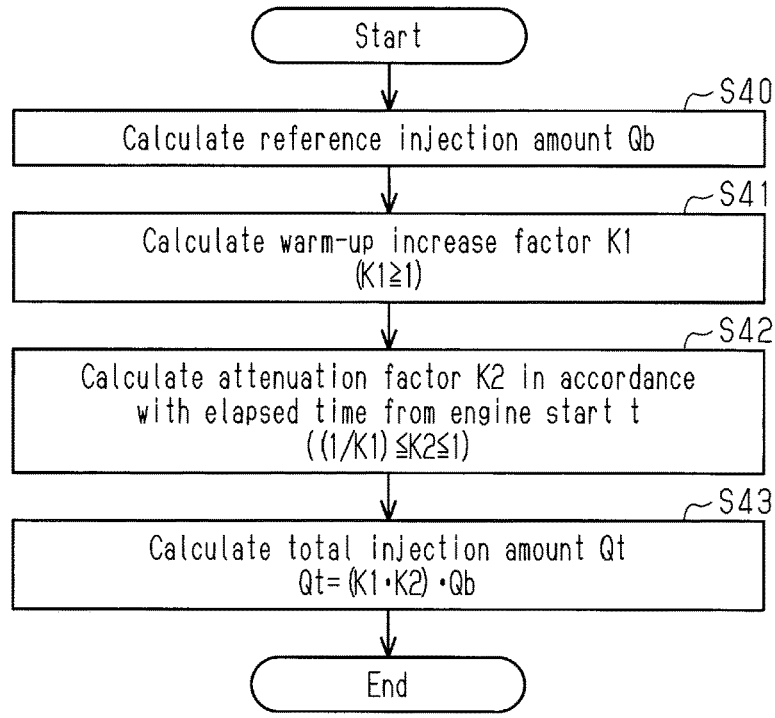
FIG. 4 is a flowchart showing a process for calculating a total injection amount, which is the total amount of fuel to be supplied to one cylinder from an intake stroke to a compression stroke.

When the internal combustion engine 10 is started and begins the self-sustaining operation, the total injection amount calculation section 51*a* in the fuel injection control device 50 executes step S40 of a total injection amount calculation process shown in FIG. 4. The process after step S40 is executed for each combustion of each cylinder 16 in the internal combustion engine 10.

At step S40, the total injection amount calculation section 51*a* calculates a reference injection amount Qb based on the operating state of the internal combustion engine 10. Specifically, the total injection amount calculation section 51*a* calculates the reference injection amount Qb based on parameters such as the flow rate value of the intake air detected by the air flow meter 13, the detection value of the crank angle detected by the crank angle sensor 61, the coolant temperature value detected by the coolant temperature sensor 62, and the depression amount of the accelerator pedal detected by the accelerator pedal sensor 63. After calculating the reference injection amount Qb, the total injection amount calculation section 51*a* proceeds to step S41.

At step S41, the total injection amount calculation section 51*a* calculates a warm-up increase factor K1. The warm-up increase factor K1 is a factor for securing the fuel necessary for warming up the exhaust purification catalyst 20 of the internal combustion engine 10, and is set to a value not less than 1. The warm-up increase factor K1 changes depending on the outside air temperature. The total injection amount calculation section 51*a* refers to the outside air temperature value detected by the outside air temperature sensor 64 and calculates the warm-up increase factor K1 such that the lower the outside air temperature, the greater the warm-up increase factor K1 becomes, and that the higher the outside air temperature, the smaller the warm-up increase factor K1 becomes. Upon completion of step S41, the total injection amount calculation section 51*a* proceeds to step S42.

At step S42, the total injection amount calculation section 51*a* calculates an attenuation factor K2. The attenuation factor K2 is a factor that changes according to the time t after the internal combustion engine 10 is started, and is a value not less than 1/K1 and not greater than 1. The total injection amount calculation section 51*a* calculates the attenuation factor K2 such that the shorter the time t from the start of the internal combustion engine 10, the closer to 1 the attenuation factor K2 becomes, and that the longer the time t from the start of the internal combustion engine 10, the closer to 1/K1 the attenuation factor K2 becomes. Upon completion of step S42, the total injection amount calculation section 51*a* proceeds to step S43.

At step S43, the total injection amount calculation section 51*a* calculates the total injection amount Qt. In calculating the total injection amount Qt, the total injection amount calculation section 51*a* multiplies the reference injection amount Qb calculated at step S40 by the warm-up increase factor K1 calculated at step S41 and the attenuation factor K2 calculated at step S42. When the internal combustion engine 10 starts the self-sustaining operation, the attenuation factor K2 is 1. Thus, K1×K2 at this time is equal to K1 and the total injection amount Qt is a value obtained by increasing the reference injection amount Qb by the warm-up increase factor K1. The attenuation factor K2 decreases over time and eventually becomes 1/K1. At this time, K1×K2 is 1, and the total injection amount Qt is equal to the reference injection amount Qb, which is no increased by the warm-up increase factor K1. When the total injection amount Qt is calculated, the total injection amount calculation process by the total injection amount calculation section 51*a* is ended.

Figure 5:
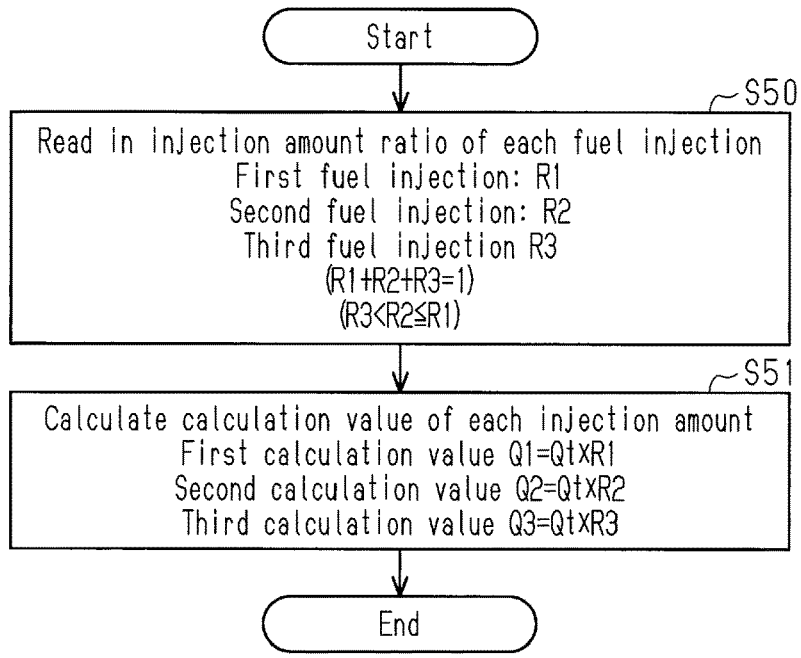
FIG. 5 is a flowchart showing a process for calculating each injection amount at three fuel injections as calculation values.

Upon completion of the total injection amount calculation process, the individual injection amount calculation section 51*b* of the fuel injection control device 50 executes step S50 of an individual injection amount calculation process shown in FIG. 5. At step S50, the individual injection amount calculation section 51*b* reads in injection ratios R1 to R3 in the first to third fuel injections from the ROM 52 of the fuel injection control device 50. The injection ratios R1 to R3 are ratios of the injection amounts at the fuel injections to the total injection amount Qt, and are set to values the total of which is 1. In addition, the injection ratio R2 is set to a value not greater than the injection ratio R1, and the injection ratio R3 is set to a value less than the injection ratio R2. After reading in the injection ratios R1 to R3, the individual injection amount calculation section 51*b* proceeds to step S51.

At step S51, the individual injection amount calculation section 51*b* multiplies the total injection amount Qt, which has been calculated in the total injection amount calculation process, by the respective injection ratios R1 to R3 to calculate the calculation values Q1 to Q3 as the injection amount at the first to third fuel injections. As described above, the sum of the injection ratios R1 to R3 is 1. Thus, the sum of the calculation values Q1 to Q3 is equal to the total injection amount Qt. When the calculation values Q1 to Q3 are calculated, the individual injection amount calculation process by the individual injection amount calculation section 51*b* is ended.

Even if the total injection amount Qt is small, the above-described injection ratio R1 is set to an appropriately great value such that the calculation value Q1 is greater than the P/L upper limit value Qpmax. Situations in which the total injection amount Qt is small include a case in which the operating state of the internal combustion engine 10 is in the idle state, in which the depression amount of the accelerator pedal is 0, the reference injection amount Qb is small, and the attenuation factor K2 is 1/K1 after a certain period of time has elapsed from when the internal combustion engine 10 started the self-sustaining operation.

Even if the total injection amount Qt is great, the above-described injection ratio R3 is set to an appropriately small value such that the calculation value Q3 is not greater than the P/L upper limit value Qpmax. Situations in which the total injection amount Qt is great include a case in which the engine load of the internal combustion engine 10 is great and the reference injection amount Qb is great, and the time from the start of the self-sustaining operation of the internal combustion engine 10 is short, and the attenuation factor K2 is 1.

Figure 6:
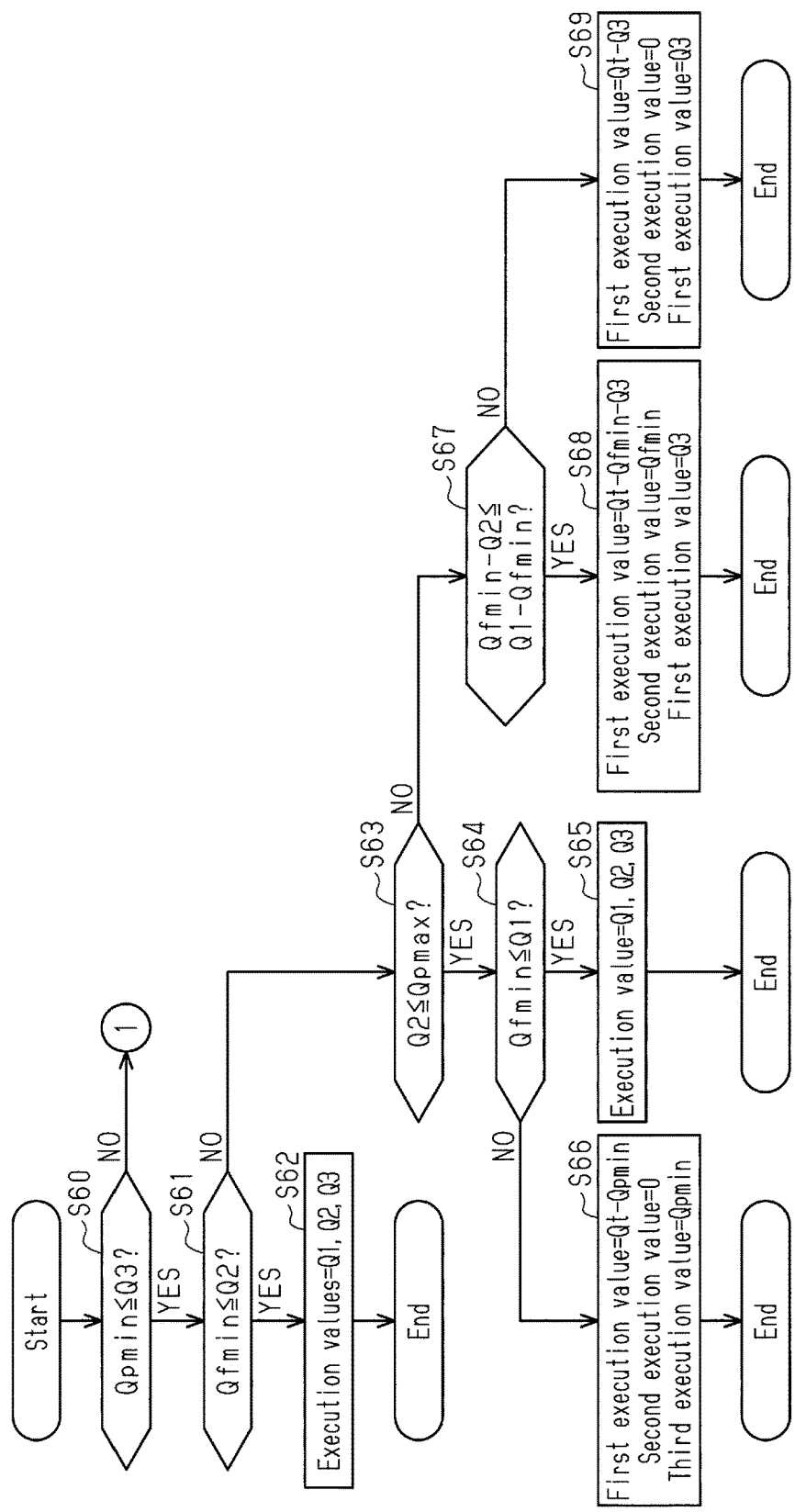
FIG. 6 is a flowchart showing a changing process for changing the calculation values of the injection amounts.
Figure 7:
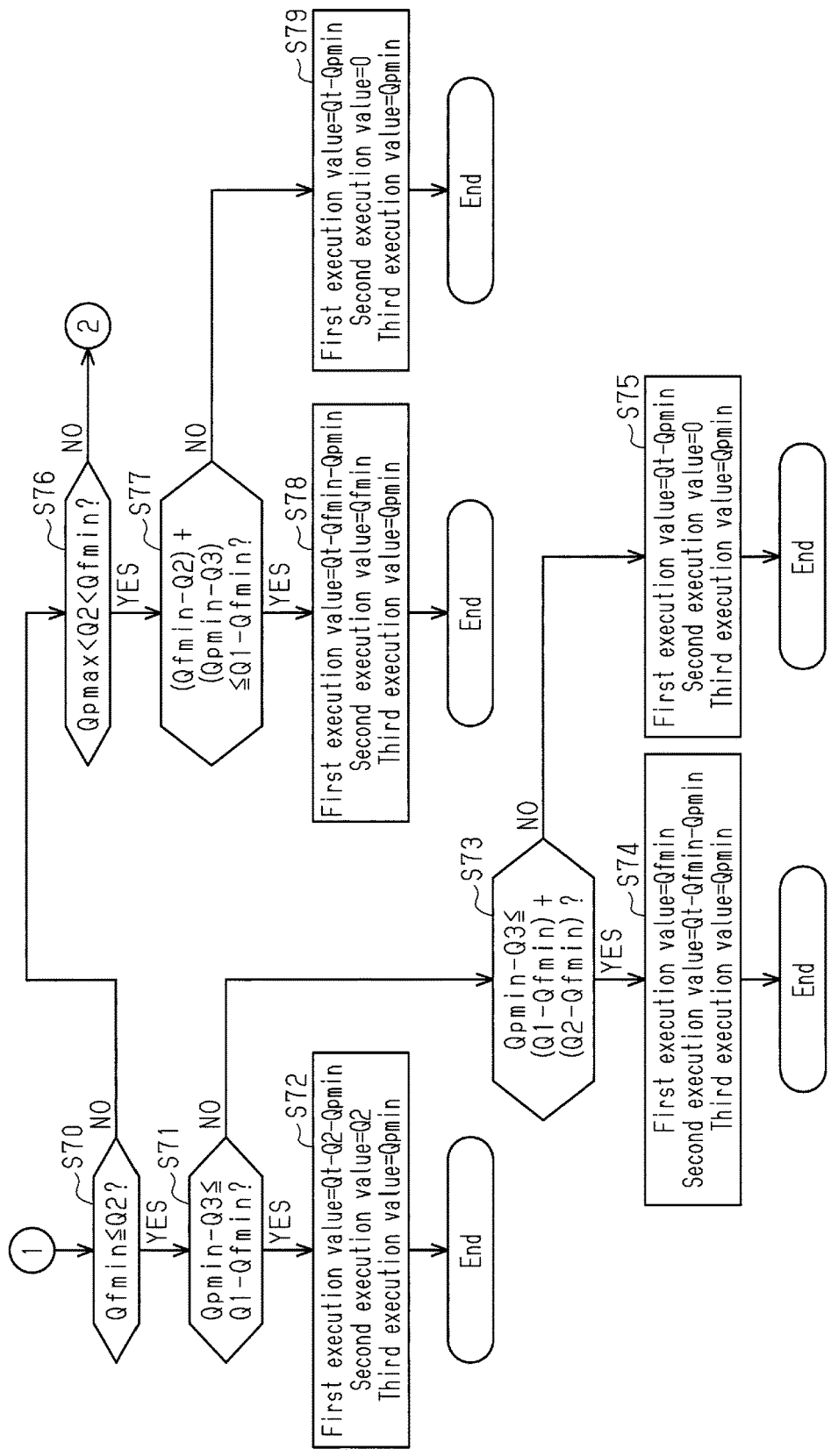
FIG. 7 is a flowchart showing the changing process for changing the calculation values of the injection amounts.
Figure 8:
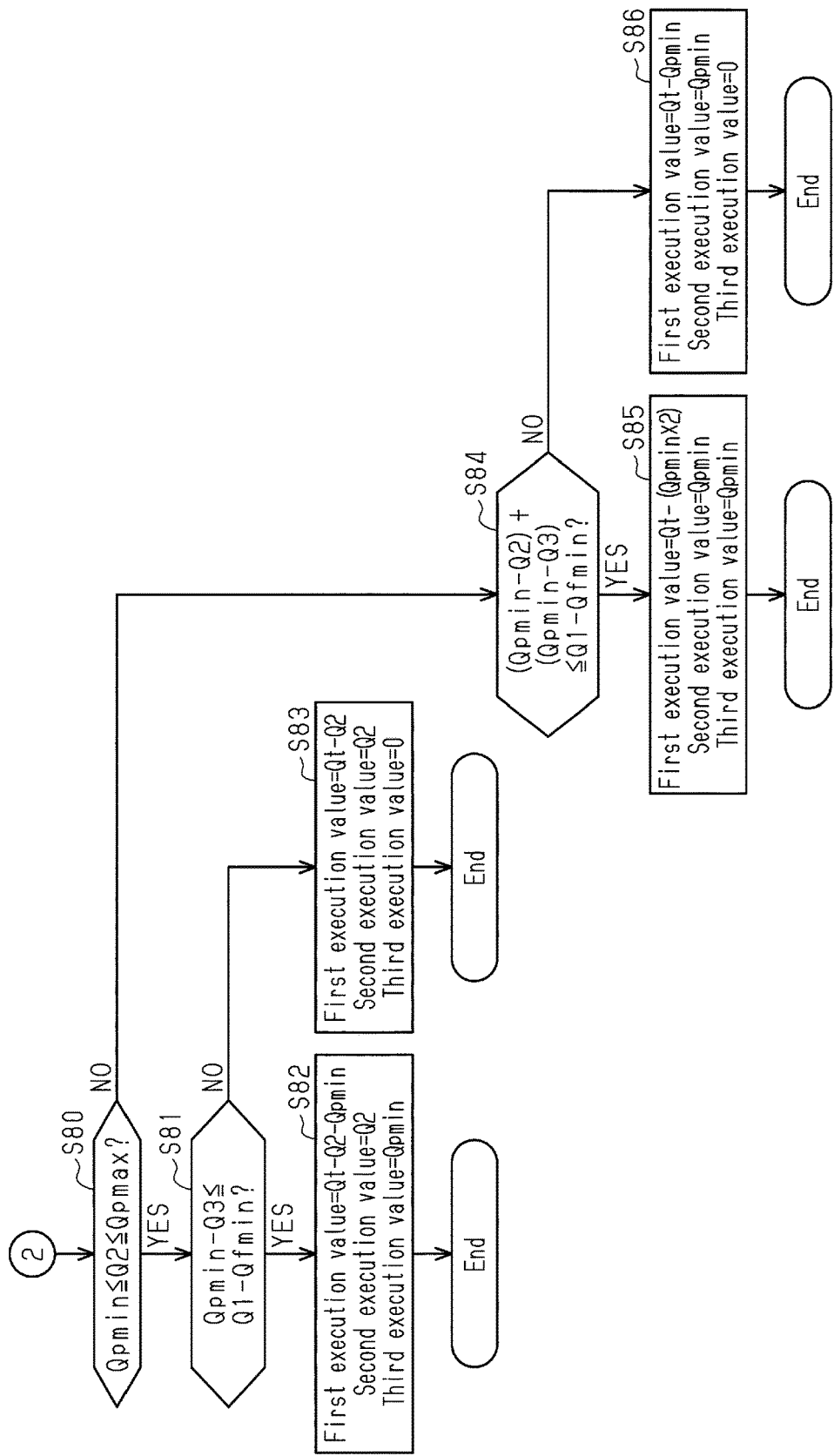
FIG. 8 is a flowchart showing the changing process for changing the calculation values of the injection amounts.

Upon completion of the individual injection amount calculation process, the injection amount changing section 51*c* of the fuel injection control device 50 executes step S60 of an injection amount changing process shown in FIGS. 6 to 8. At step S60, the injection amount changing section 51*c* determines whether the condition (P/L lower limit value Qpmin Calculation value Q3) is satisfied. When it is determined that the calculation value Q3 is not less than the P/L lower limit value Qpmin (YES at step S60), the injection amount changing section 51*c* proceeds to step S61.

At step S61, the injection amount changing section 51*c* determines whether the condition (F/L lower limit value Qfmin≤Calculation value Q2) is satisfied. When it is determined that the calculation value Q2 is not less than the F/L lower limit value Qfmin (YES at step S61), the injection amount changing section 51c proceeds to step S62.

Figure 9:
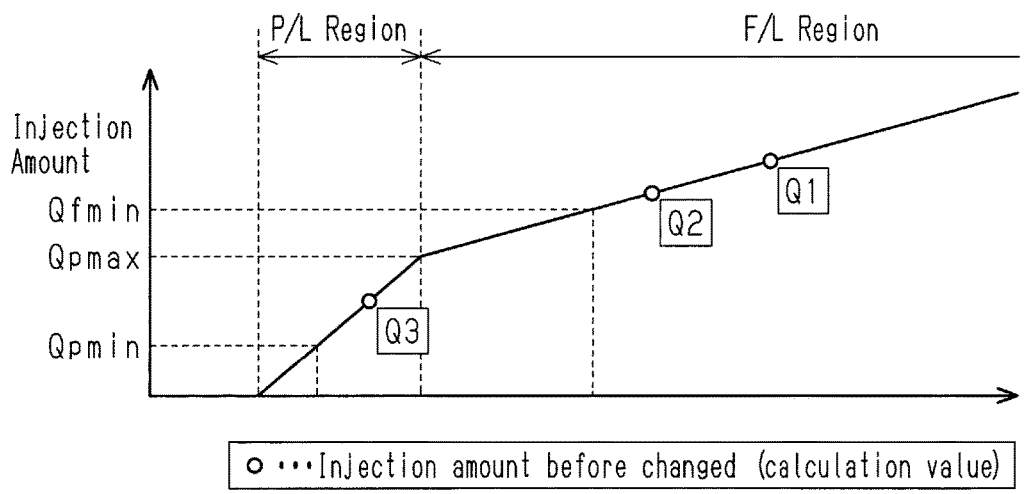
FIG. 9 is an explanatory diagram showing changes in the injection amounts made by the changing process.

When the injection amount changing section 51c has reached step S62, the calculation value Q3 is not less than the P/L lower limit value Qpmin as shown in FIG. 9. In addition, as described above, since the injection ratio R 3 is set to an appropriately small value, the calculation value Q3 will not exceed the P/L upper limit value Qpmax. Thus, the calculation value Q3 is within a range not less than the P/L lower limit value Qpmin and not greater than the P/L upper limit value Qpmax, in which variation in the injection amount is small. Further, the calculation value Q2 is not less than the F/L lower limit value Qfmin. Since the injection ratio R1 is not less than the injection ratio R2, the calculation value Q1 is also not less than the F/L lower limit value Qfmin, at which variation in the injection amount is small like the calculation value Q2. Therefore, at step S62, the injection amount changing section 51c sets the execution values of the first to third fuel injections to the calculation values Q1, Q2, Q3 without changing these values. When the execution value of each fuel injection is set, the injection amount changing process by the injection amount changing section 51c is ended.

When the calculation value Q2 is less than the F/L lower limit value Qfmin at step S61 (NO at step S61), the injection amount changing section 51c proceeds to step S63. At step S63, the injection amount changing section 51c determines whether the condition (Calculation value Q2≤P/L upper limit value Qpmaz) is satisfied. When the calculation value Q2 is not greater than the P/L upper limit value Qpmax, the injection amount changing section 51c proceeds to step S64.

At step S64, the injection amount changing section 51c determines whether the condition (F/L lower limit value Qfmin≤Calculation value Q1) is satisfied. When it is determined that the calculation value Q1 is not less than the F/L lower limit value Qfmin (YES at step S64), the injection amount changing section 51c proceeds to step S65.

Figure 10:
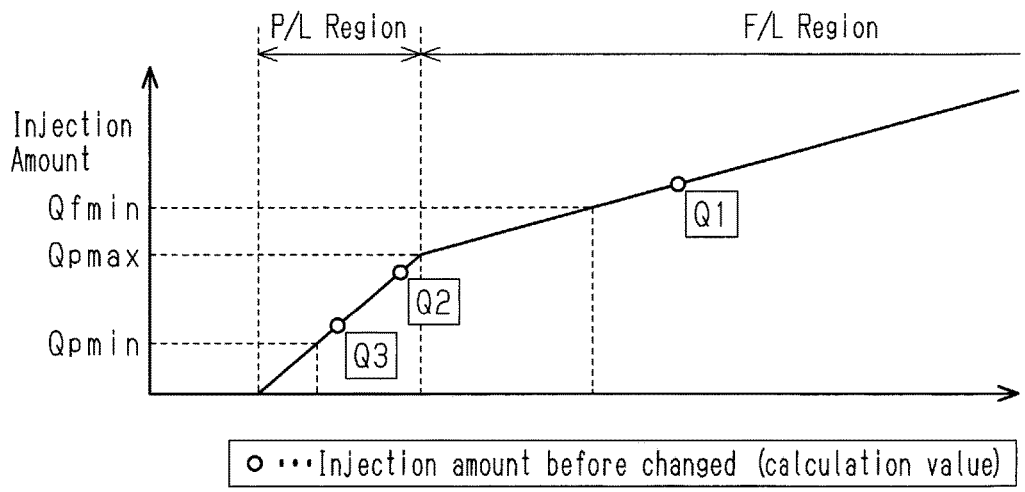
FIG. 10 is an explanatory diagram showing changes in the injection amounts made by the changing process.

When the injection amount changing section 51c has reached step S65, the calculation values Q2 and Q3 are in a range not less than the P/L lower limit value Qpmin and not greater than the P/L upper limit value Qpmax, in which variation in the injection amount is small, as shown in FIG. 10. Further, the calculation value Q1 is not less than the F/L lower limit value Qfmin, at which variation in the injection amount is small. Therefore, at step S65, the injection amount changing section 51c sets the execution values of the first to third fuel injections to the calculation values Q1, Q2, Q3 without changing these values. When the execution value of each fuel injection is set, the injection amount changing process by the injection amount changing section 51c is ended.

When it is determined that the calculation value Q1 is less than the F/L lower limit value Qfmin at step S64 (NO at step S64), the injection amount changing section 51c proceeds to step S66.

Figure 11:
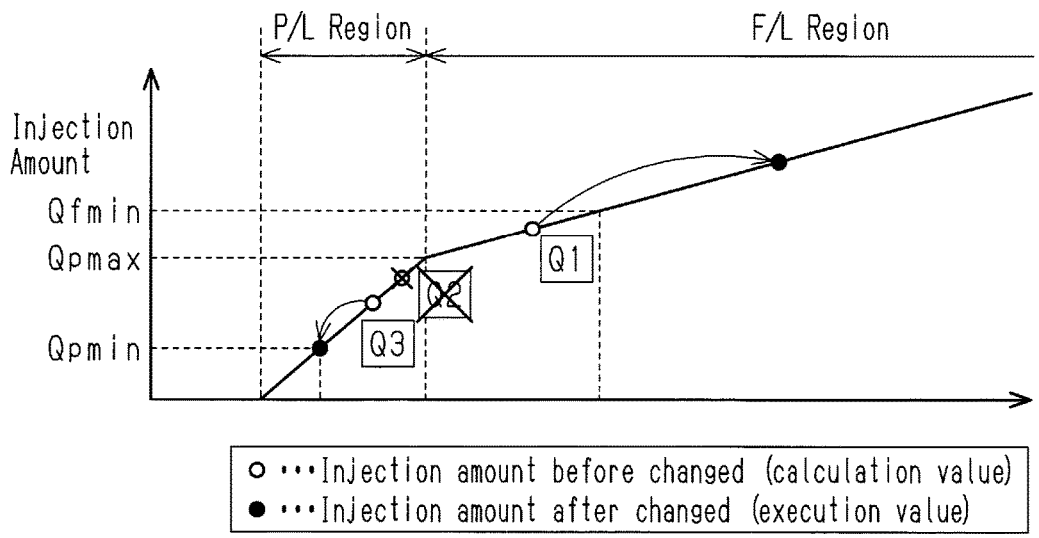
FIG. 11 is an explanatory diagram showing changes in the injection amounts made by the changing process.

When the injection amount changing section 51c has reached step S66, the calculation values Q2 and Q3 are in a range not less than the P/L lower limit value Qpmin and not greater than the P/L upper limit value Qpmax, in which variation in the injection amount is small, as shown in FIG. 11. Further, the calculation value Q1 is within a range greater than the P/L upper limit value Qpmax and less than the F/L lower limit value Qfmin, in which variation in the injection amount is great. Therefore, at step S66, the injection amount changing section 51c reduces the execution value Q3 to the P/L lower limit value Qpmin and sets the execution value of the third fuel injection to the reduced value. In addition, the injection amount changing section 51c reduces the calculation value Q2 to 0, and sets the execution value of the second fuel injection to 0. Further, the injection amount changing section 51c subtracts the P/L lower limit value Qpmin from the total injection amount Qt, and sets the execution value of the first fuel injection to the resultant value as the execution value Q1. That is, the injection amount changing section 51c increases the calculation value Q1 by the reduced amounts of the calculation values Q3, Q2 and sets the execution value to the resultant value. When the execution value of each fuel injection is set, the injection amount changing process by the injection amount changing section 51c is ended. FIG. 11 schematically shows the increase/reduce of the calculation values Q1, Q2, Q3, and the increased amounts and the reduced amounts of the calculation values Q1, Q2, Q3 are not equal to each other. This applies to FIGS. 11 to 23, which will be referred to in the following description.

The execution value (Qpmin) of the third fuel injection is within a range in which variation in the injection amount is small. In addition, after being changed to be outside the range in which the variation in the injection amount is great, the calculation value Q1 is set to the value (Qt−Qpmin) as the execution value of the first fuel injection. Then, there is a possibility that the execution value (Qt−Qpmin) will be a value not less than the F/L lower limit value Qfmin. Therefore, according to the changing process of step S66, the execution value of the fuel injection is easily set within a range in which variation in the injection amount is small. At step S66, as the result of setting the execution value of the second fuel injection to 0, the number of times of the fuel injection is changed from 3 to 2.

When it is determined at step S63 that the calculation value Q2 is greater than the P/L upper limit value Qpmax (NO at step S63), the injection amount changing section 51c proceeds to step S67. At step S67, the injection amount changing section 51c determines whether the condition (F/L lower limit value Qfmin−Calculation value Q2≤Calculation value Q1−F/L lower limit value Qfmin) is satisfied. When it is determined that the condition is satisfied (YES at step S67), the injection amount changing section 51c proceeds to step S68.

Figure 12:
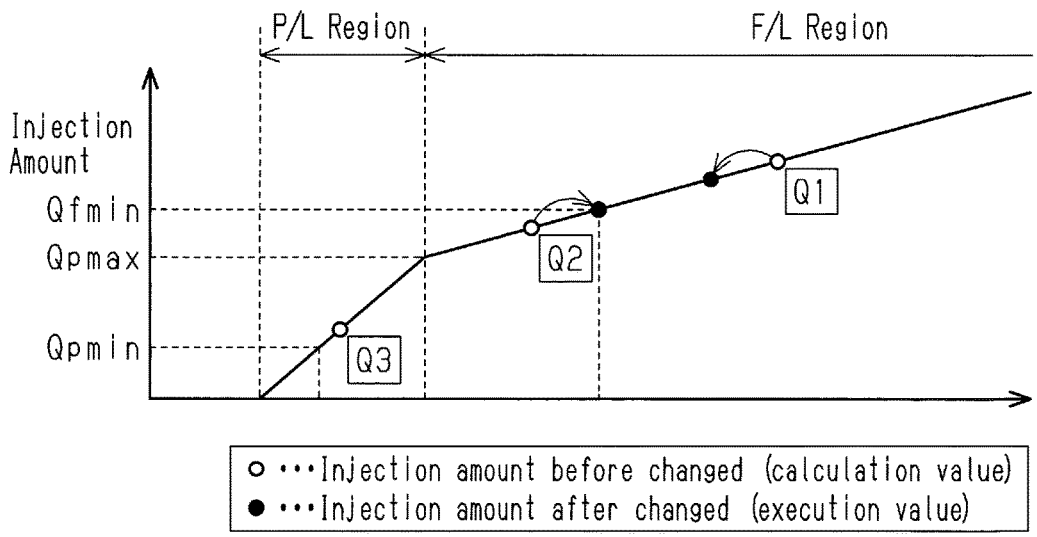
FIG. 12 is an explanatory diagram showing changes in the injection amounts made by the changing process.

When the injection amount changing section 51c has reached step S68, the calculation value Q3 is in a range not less than the P/L lower limit value Qpmin and not greater than the P/L upper limit value Qpmax, in which variation in the injection amount is small, as shown in FIG. 12. Further, the calculation value Q1 is not less than the F/L lower limit value Qfmin, at which variation in the injection amount is small. In contrast, the calculation value Q2 is within a range greater than the P/L upper limit value Qpmax and less than the F/L lower limit value Qfmin, in which variation in the injection amount is great. Therefore, at step S68, the injection amount changing section 51c sets the execution value of the third fuel injection to the calculation value Q3 without changing the value. In addition, the injection amount changing section 51c increases the calculation value Q2 to the F/L lower limit value Qfmin and sets the execution value of the second fuel injection to the resultant value. Then, the injection amount changing section 51c reduces the calculation value Q1 to the value obtained by subtracting the F/L lower limit value Qfmin and the execution value Q3 from the total injection amount Qt, and sets the execution value of the first fuel injection to the resultant value. That is, the injection amount changing section 51c reduces the calculation value Q1 by the increased amount of the calculation value Q2 and sets the execution value to the resultant value. When the execution value of each fuel injection is set, the injection amount changing process by the injection amount changing section 51c is ended. The process of step S68 corresponds to a second changing process executed by the injection amount changing section 51c.

The execution value (F/L lower limit value Qfmin) of the second fuel injection is within a range in which variation in the injection amount is small. Further, the difference between the calculation value Q1 and the F/L lower limit value Qfmin is not less than the difference between the F/L lower limit value Qfmin and the calculation value Q2. Thus, even if the amount by which the calculation value Q2 has been increased to the execution value (F/L lower limit value Qfmin) is subtracted from the calculation value Q1, the execution value of the first fuel injection will not fall within the range greater than the P/L upper limit value Qpmax and less than the F/L lower limit value Qfmin, in which the variation is great. Therefore, the execution values of the first to third fuel injections are set within the range in which variation in the fuel injection is small.

When it is determined at step S67 that the condition (F/L lower limit value Qfmin−Calculation value Q2≤Calculation value Q1−F/L lower limit value Qfmin) is not satisfied (NO at step S67), the injection amount changing section 51c proceeds to step S69.

Figure 13:
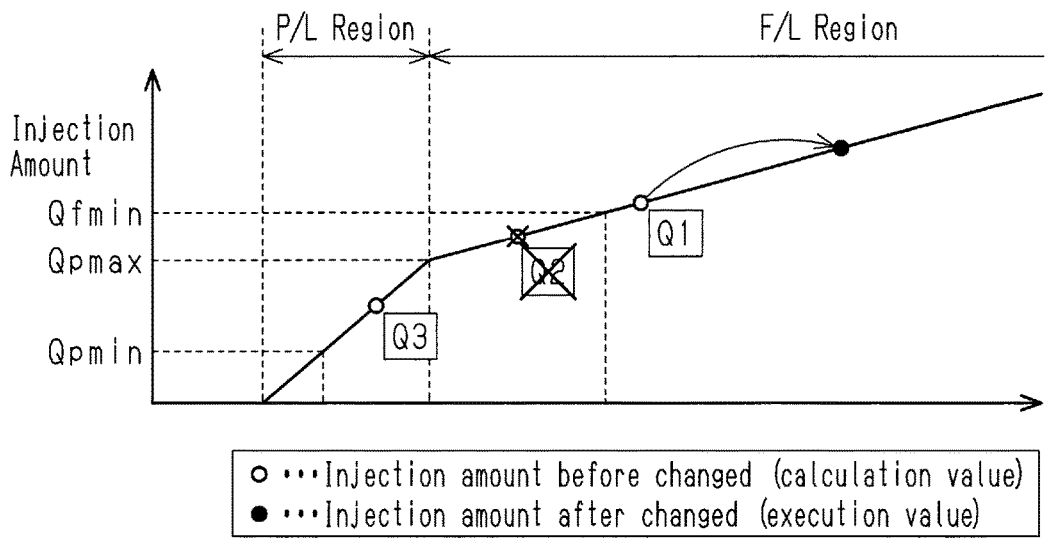
FIG. 13 is an explanatory diagram showing changes in the injection amounts made by the changing process.

When the injection amount changing section 51c has reached step S69, the calculation value Q3 is in a range not less than the P/L lower limit value Qpmin and not greater than the P/L upper limit value Qpmax, in which variation in the injection amount is small, as shown in FIG. 13. Further, the calculation value Q1 is not less than the F/L lower limit value Qfmin, at which variation in the injection amount is small. However, the calculation value Q1 is relatively close to the F/L lower limit value Qfmin. When greatly reduced, the calculation value Q1 would drop below the F/L lower limit value Qfmin. Also, the calculation value Q2 is within a range greater than the P/L upper limit value Qpmax and less than the F/L lower limit value Qfmin, in which variation in the injection amount is great. Therefore, at step S69, the injection amount changing section 51c sets the execution value of the third fuel injection to the calculation value Q3 without changing the value. In addition, the injection amount changing section 51c reduces the calculation value Q2 to 0, and sets the execution value of the second fuel injection to 0. Then, the calculation value Q1 is increased to the value obtained by subtracting the calculation value Q3 from the total injection amount Qt, and the execution value of the first fuel injection is set to the resultant value. That is, the injection amount changing section 51c increases the calculation value Q1 by the reduced amount of the calculated value Q2 and sets the execution value to the resultant value. When the execution value of each fuel injection is set, the injection amount changing process by the injection amount changing section 51c is ended. The process of step S69 corresponds to a third changing process executed by the injection amount changing section 51c.

The execution value (P/L lower limit value Qpmin) of the third fuel injection is within a range in which variation in the injection amount is small. In addition, since the calculation value Q1 before being increased is not less than the F/L lower limit value Qfmin, even if the calculation value Q1 is increased and set as the execution value of the first fuel injection, the execution value Q1 is still not less than the F/L lower limit value Qfmin. In this manner, the execution values of the third and first fuel injections are set within a range in which the variation is small. At step S69, as the result of setting the execution value of the second fuel injection to 0, the number of times of the fuel injection is changed from 3 to 2.

When it is determined at step S60 that the calculation value Q3 is less than the P/L lower limit value Qpmin (NO at step S60), the injection amount changing section 51c proceeds to step S70 shown in FIG. 7.

At step S70, the injection amount changing section 51c determines whether the condition (F/L upper limit value Qfmin≤Calculation value Q2) is satisfied. When the calculation value Q2 is not less than the F/L upper limit value Qfmin, the injection amount changing section 51c proceeds to step S71. At step S71, the injection amount changing section 51c determines whether the condition (P/L lower limit value Qpmin−Calculation value Q3 Calculation value Q1−F/L lower limit value Qfmin) is satisfied. When this condition is satisfied (YES at step S71), the injection amount changing section 51c proceeds to step S72.

Figure 14:
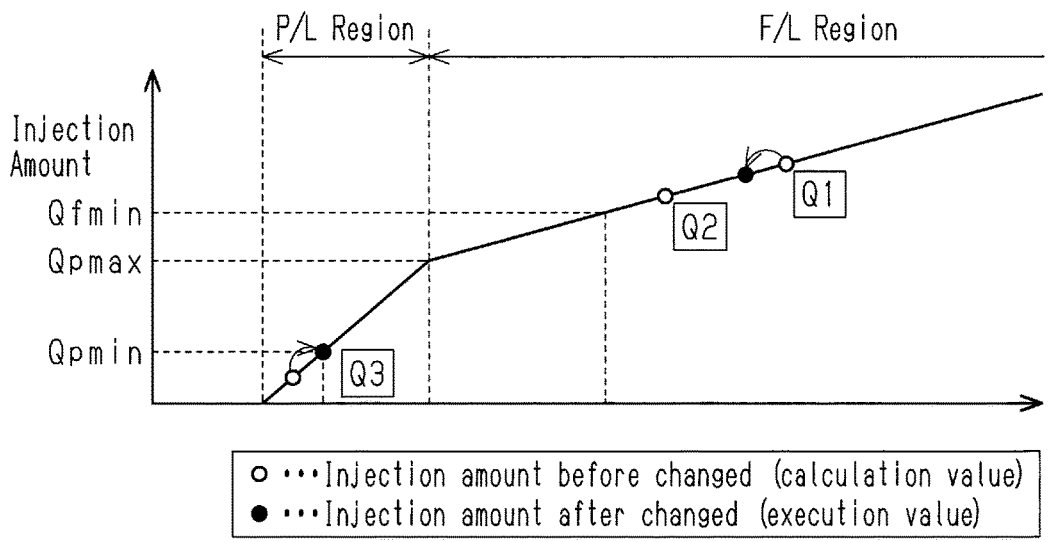
FIG. 14 is an explanatory diagram showing changes in the injection amounts made by the changing process.

When the injection amount changing section 51c has reached step S72, the calculation value Q3 is less the P/L lower limit value Qpmin, at which variation in the injection amount is great, as shown in FIG. 14. The calculation values Q2, Q3 are not less than the F/L lower limit value Qfmin, at which variation in the injection amount is small. Therefore, at step S72, the injection amount changing section 51c increases the execution value Q3 to the P/L lower limit value Qpmin and sets the execution value of the third fuel injection to the resultant value. In addition, the injection amount changing section 51c sets the execution value of the second fuel injection to the calculation value Q2 without changing it. Then, the injection amount changing section 51c reduces the calculation value Q1 to the value obtained by subtracting the calculation value Q2 and the P/L lower limit value Qpmin from the total injection amount Qt, and sets the execution value of the first fuel injection to the resultant value. That is, the injection amount changing section 51c reduces the calculation value Q1 by the increased amount of the calculation value Q3 and sets the execution value to the resultant value. When the execution value of each fuel injection is set, the injection amount changing process by the injection amount changing section 51c is ended. In FIG. 14, the execution value of the first fuel injection is shown as a value greater than the execution value of the second fuel injection. However, depending on the values of the injection ratios R1 and R2 and the value of the total injection amount Qt, the execution value of the first fuel injection may become less than the execution value of the second fuel injection as a result of the process of step S72. The process of step S72 corresponds to a first changing process executed by the injection amount changing section 51c.

The execution value (P/L lower limit value Qpmin) of the third fuel injection and the execution value (Q2) of the second fuel injection are within a range in which variation in the injection amount is small. Further, the difference between the calculation value Q1 and the F/L lower limit value Qfmin is not less than the difference between the P/L lower limit value Qpmin and the calculation value Q3. Thus, even if the amount by which the calculation value Q3 has been increased to the execution value (P/L lower limit value Qpmin) is subtracted from the calculation value Q1, the execution value of the first fuel injection will not fall within the range greater than the P/L upper limit value Qpmax and less than the F/L lower limit value Qfmin, in which the variation is great. Therefore, the execution values of the first to third fuel injections are set within the range in which variation in the fuel injection is small.

When it is determined at step S71 that the condition (P/L lower limit value Qpmin−Calculation value Q3≤Calculation value Q1−F/L lower limit value Qfmin) is not satisfied (NO at step S71), the injection amount changing section 51c proceeds to step S73.

At step S73, the injection amount changing section 51c determines whether the condition (P/L lower limit value Qpmin−Calculation value Q3≤(Calculation value Q1−F/L lower limit value Qfmin)+(Calculation value Q2−F/L lower limit value Qfmin)) is satisfied. When this condition is satisfied (YES at step S73), the injection amount changing section Sic proceeds to step S74.

Figure 15:
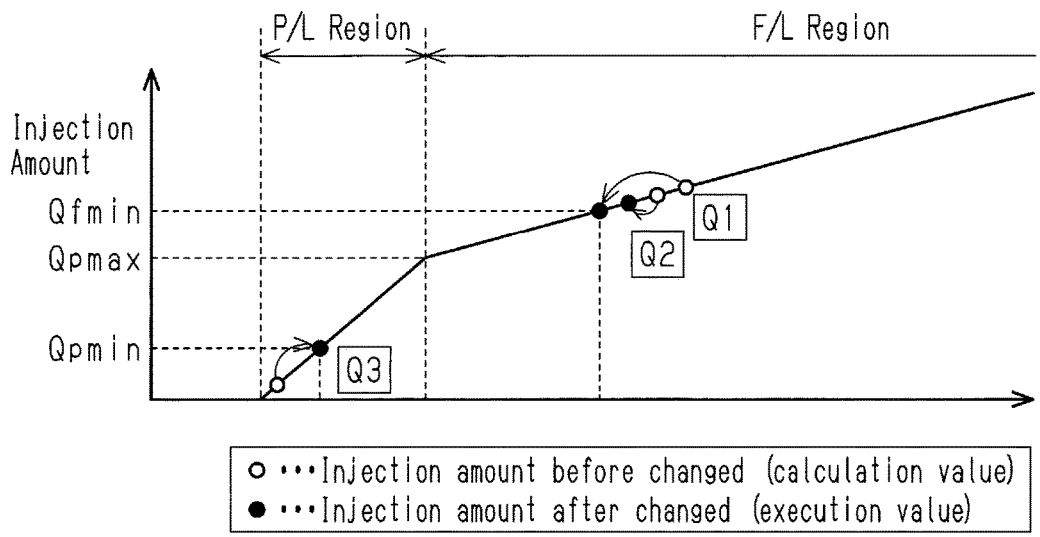
FIG. 15 is an explanatory diagram showing changes in the injection amounts made by the changing process.

When the injection amount changing section 51c has reached step S74, the calculation value Q3 is less the P/L lower limit value Qpmin, at which variation in the injection amount is great, as shown in FIG. 15. The calculation values Q2, Q1 are not less than the F/L lower limit value Qfmin, at which variation in the injection amount is small. However, the calculation value Q1 is relatively close to the F/L lower limit value Qfmin. When greatly reduced, the calculation value Q1 would drop below the F/L lower limit value Qfmin. Therefore, at step S74, the injection amount changing section 51c increases the execution value Q3 to the P/L lower limit value Qpmin and sets the execution value of the third fuel injection to the resultant value. In addition, the injection amount changing section 51c reduces the calculation value Q1 to the F/L lower limit value Qfmin, and sets the execution value of the first fuel injection to the resultant value. Further, the injection amount changing section 51c reduces the calculation value Q2 to the value obtained by subtracting the F/L lower limit value Qfmin and the P/L lower limit value Qpmin from the total injection amount Qt, and sets the execution value of the second fuel injection to the resultant value. That is, the injection amount changing section 51c reduces the calculation values Q2 and Q1 by the increased amount of the calculation value Q3 and sets the execution values to the resultant values, respectively. When the execution value of each fuel injection is set, the injection amount changing process by the injection amount changing section 51c is ended. The process of step S72 corresponds to a first changing process executed by the injection amount changing section 51c.

The execution value (P/L lower limit value Qpmin) of the third fuel injection and the execution value (F/L lower limit value Qfmin) of the first fuel injection are both within a range in which variation in the injection amount is small. The value obtained by adding the difference between the calculation value Q1 and the F/L lower limit value Qfmin to the difference between the calculation value Q2 and the F/L lower limit value Qfmin is not less than the difference between the P/L lower limit value Qpmin and the calculation value Q3. Therefore, even if a part of the amount by which the calculation value Q3 has been increased to the execution value (P/L lower limit value Qpmin) is subtracted from the calculation Q2 to set the execution value of the second fuel injection to the value (Total injection amount Qt−F/L lower limit value Qfmin−P/L lower limit value Qpmin), the execution value will not fall within the range greater than the P/L upper limit value Qpmax and less than the F/L lower limit value Qfmin, in which variation in the injection amount is great. Therefore, the execution values of the first to third fuel injections are set within the range in which variation in the fuel injection is small.

When it is determined at step S73 that the condition (P/L lower limit value Qpmin−Calculation value Q3 (Calculation value Q1−F/L lower limit value Qfmin)+(Calculation value Q2−F/L lower limit value Qfmin)) is not satisfied (NO at step S73), the injection amount changing section 51c proceeds to step S75.

Figure 16:
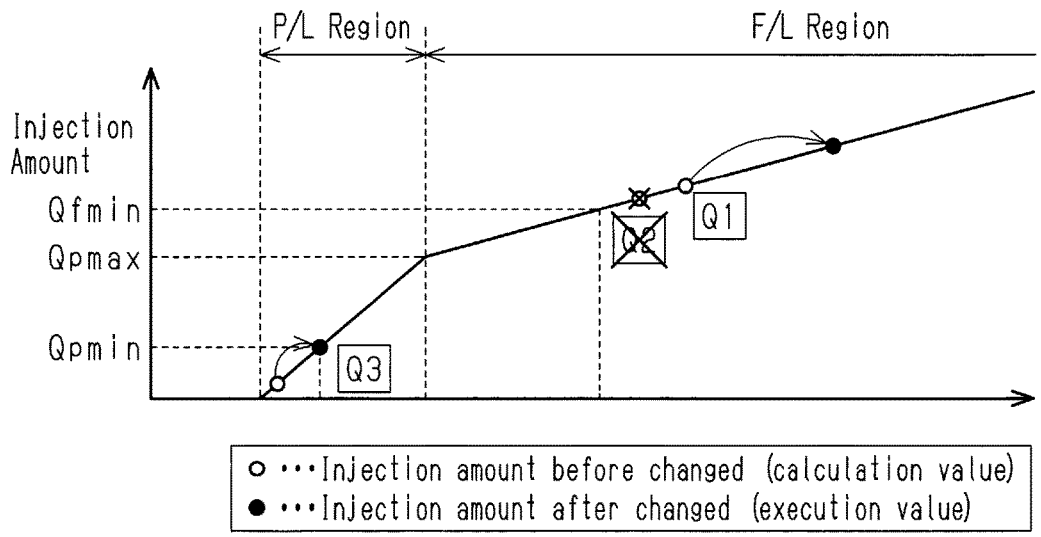
FIG. 16 is an explanatory diagram showing changes in the injection amounts made by the changing process.

When the injection amount changing section 51c has reached step S75, the calculation value Q3 is less the P/L lower limit value Qpmin, at which variation in the injection amount is great, as shown in FIG. 16. The calculation values Q2, Q1 are not less than the F/L lower limit value Qfmin, at which variation in the injection amount is small. However, the calculation values Q1, Q2 are relatively close to the F/L lower limit value Qfmin. When greatly reduced, the calculation values Q1, Q2 would drop below the F/L lower limit value Qfmin. Therefore, at step S75, the injection amount changing section 51c increases the execution value Q3 to the P/L lower limit value Qpmin and sets the execution value of the third fuel injection to the resultant value. In addition, the injection amount changing section 51c reduces the calculation value Q2 to 0, and sets the execution value of the second fuel injection to 0. Further, the injection amount changing section 51c increases the calculation value Q1 to the value obtained by subtracting the P/L lower limit value Qpmin from the total injection amount Qt, and sets the execution value of the first fuel injection to the resultant value. That is, the injection amount changing section 51c reduces the calculation value Q1 by the increased amount of the calculation value Q3 and increases the calculation value Q1 by the reduced amount of the calculation value Q2. The injection amount changing section 51c then sets the execution values to those resultant values. When the execution value of each fuel injection is set, the injection amount changing process by the injection amount changing section 51c is ended. The process of step S75 corresponds to a first changing process executed by the injection amount changing section 51c.

The execution value (P/L lower limit value Qpmin) of the third fuel injection is within a range in which variation in the injection amount is small. In addition, since the calculation value Q1 before being increased is not less than the F/L lower limit value Qfmin, even if the calculation value Q1 is increased and set as the execution value of the first fuel injection, the execution value Q1 is still not less than the F/L lower limit value Qfmin. In this manner, the execution values of the third and first fuel injections are set within a range in which the variation is small. At step S75, as the result of setting the execution value of the second fuel injection to 0, the number of times of the fuel injection is changed from 3 to 2.

When the calculation value Q2 is determined to be less than the F/L lower limit value Qfmin at step S70 (NO at step S70), the injection amount changing section 51c proceeds to step S76. At step S76, the injection amount changing section 51c determines whether the condition (P/L upper limit value Qpmax<Calculation value Q2<F/L lower limit value Qfmin) is satisfied. When it is determined that the calculation value Q2 is greater than the P/L upper limit value Qpmax and less than the F/L lower limit value Qfmin (YES at step S76), the injection amount changing section 51c proceeds to step S77.

At step S77, the injection amount changing section 51c determines whether the condition ((F/L lower limit value Qfmin−Calculation value Q2)+(P/L lower limit value Qpmin−Calculation value Q3)≤Calculation value Q1−F/L lower limit value Qfmin) is satisfied. When this condition is satisfied (YES at step S77), the injection amount changing section 51c proceeds to step S78.

Figure 17:
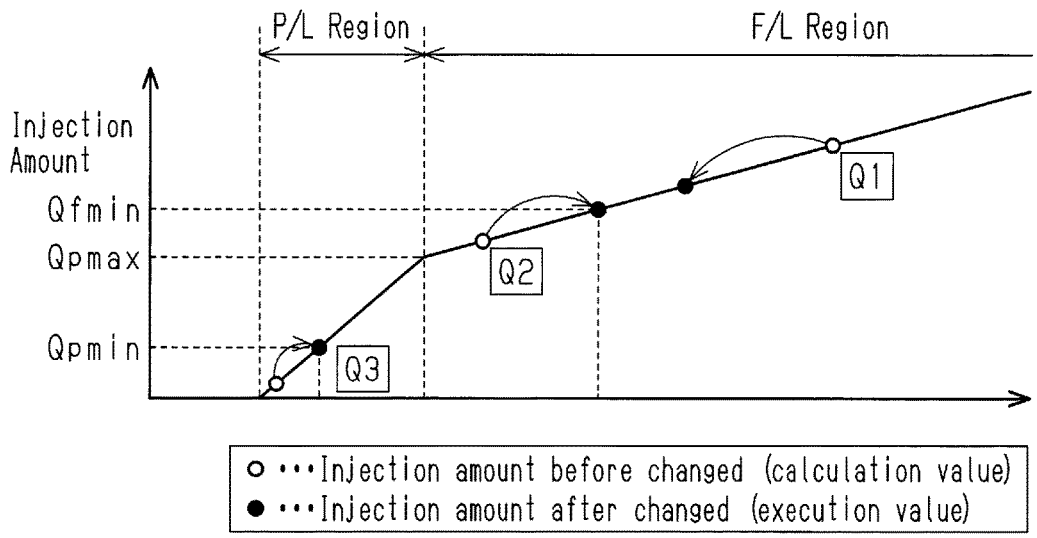
FIG. 17 is an explanatory diagram showing changes in the injection amounts made by the changing process.

When the injection amount changing section 51c has reached step S78, the calculation value Q3 is less the P/L lower limit value Qpmin, at which variation in the injection amount is great, as shown in FIG. 17. Also, the calculation value Q2 is within a range greater than the P/L upper limit value Qpmax and less than the F/L lower limit value Qfmin, in which variation in the injection amount is great. The calculation value Q1 is not less than the F/L lower limit value Qfmin, at which variation is small. Therefore, at step S78, the injection amount changing section 51c increases the execution value Q3 to the P/L lower limit value Qpmin and sets the execution value of the third fuel injection to the resultant value. In addition, the injection amount changing section 51c increases the calculation value Q2 to the F/L lower limit value Qfmin and sets the execution value of the second fuel injection to the resultant value. Further, the injection amount changing section 51c reduces the calculation value Q1 to the value obtained by subtracting the F/L lower limit value Qfmin and the P/L lower limit value Qpmin from the total injection amount Qt, and sets the execution value of the first fuel injection to the resultant value. That is, the injection amount changing section 51c reduces the calculation value Q1 by the increased amounts of the calculation values Q3, Q2 and sets the execution values to the resultant value. When the execution value of each fuel injection is set, the injection amount changing process by the injection amount changing section 51c is ended. The process of step S78 corresponds to the first and second changing processes executed by the injection amount changing section 51c.

The execution value (P/L lower limit value Qpmin) of the third fuel injection and the execution value (F/L lower limit value Qfmin) of the second fuel injection are both within a range in which variation in the injection amount is small. The difference between the calculation value Q1 and the F/L lower limit value Qfmin is not less than the value obtained by adding the difference between the P/L lower limit value Qpmin and the calculation value Q3 to the difference between the F/L lower limit value Qfmin and the calculation value Q2. Therefore, even if the amounts by which the calculation values Q3, Q2 have been increased are subtracted from the calculation value Q1 to set the execution value of the first fuel injection to the value (Total injection amount Qt−F/L lower limit value Qfmin−P/L lower limit value Qpmin), the execution value will not become a value in a that is not less than the P/L lower limit value Qpmin and less than the F/L lower limit value Qfmin, in which variation is great. Therefore, the execution values of the first to third fuel injections are set within the range in which variation in the fuel injection is small.

When it is determined at step S77 that the condition ((F/L lower limit value Qfmin−Calculation value Q2)+(P/L lower limit value−Calculation value Q3)≤Calculation value Q1−F/L lower limit value Qfmin) is not satisfied (NO at step S77), the injection amount changing section 51c proceeds to step S79.

Figure 18:
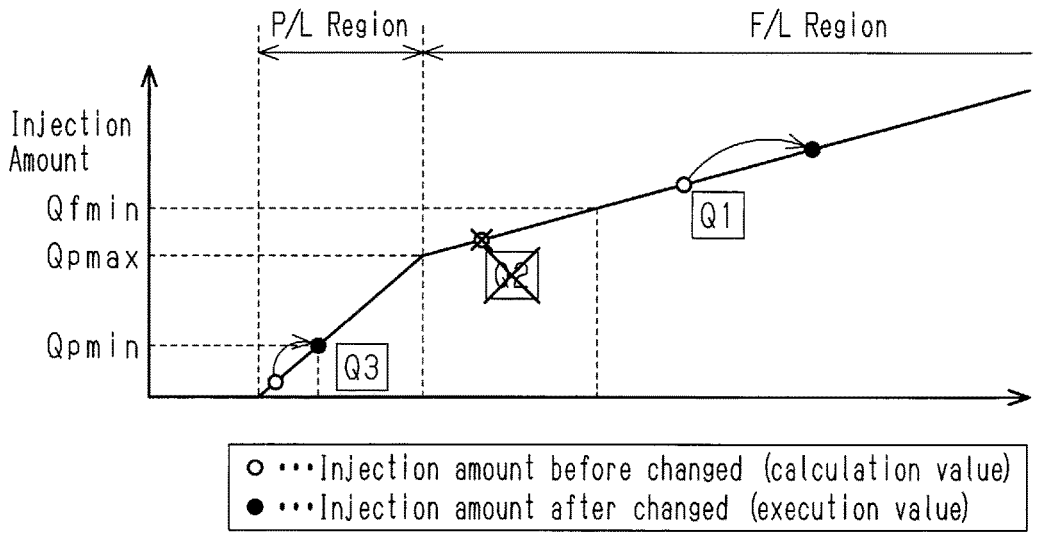
FIG. 18 is an explanatory diagram showing changes in the injection amounts made by the changing process.

When the injection amount changing section 51c has reached step S79, the calculation value Q3 is less the P/L lower limit value Qpmin, at which variation in the injection amount is great, as shown in FIG. 18. Also, the calculation value Q2 is within a range greater than the P/L upper limit value Qpmax and less than the F/L lower limit value Qfmin, in which variation in the injection amount is great. The calculation value Q1 is not less than the F/L lower limit value Qfmin, at which variation is small. However, the calculation value Q1 is relatively close to the F/L lower limit value Qfmin. When greatly reduced, the calculation value Q1 would drop below the F/L lower limit value Qfmin. Therefore, at step S79, the injection amount changing section 51c increases the execution value Q3 to the P/L lower limit value Qpmin and sets the execution value of the third fuel injection to the resultant value. In addition, the injection amount changing section 51c reduces the calculation value Q2 to 0, and sets the execution value of the second fuel injection to 0. Further, the injection amount changing section 51c increases the calculation value Q1 to the value obtained by subtracting the P/L lower limit value Qpmin from the total injection amount Qt, and sets the execution value of the first fuel injection to the resultant value. That is, the injection amount changing section 51c reduces the calculation value Q1 by the increased amount of the calculation value Q3 and increases the calculation value Q1 by the reduced amount of the calculation value Q2. The injection amount changing section 51c then sets the execution values to those resultant values. When the execution value of each fuel injection is set, the injection amount changing process by the injection amount changing section 51c is ended. The process of step S79 corresponds to the first and third changing processes executed by the injection amount changing section 51c.

The execution value (P/L lower limit value Qpmin) of the third fuel injection is within a range in which variation in the injection amount is small. In addition, since the calculation value Q1 before being increased is not less than the F/L lower limit value Qfmin, even if the calculation value Q1 is increased and set as the execution value of the first fuel injection, the execution value Q1 is still not less than the F/L lower limit value Qfmin. In this manner, the execution values of the third and first fuel injections are set within a range in which the variation is small. At step S79, as the result of setting the execution value of the second fuel injection to 0, the number of times of the fuel injection is changed from 3 to 2.

When it is determined at step S76 that the calculation value Q2 is less than the P/L lower limit value Qpmin (NO at step S76), the injection amount changing section 51c proceeds to step S80 shown in FIG. 8.

At step S80, the injection amount changing section 51c determines whether the condition (P/L lower limit value Qpmin≤Calculation value Q2≤P/L upper limit value Qpmax) is satisfied. When it is determined that the calculation value Q2 is in the range not less than the P/L lower limit value Qpmin and not greater than the P/L upper limit value Qpmax (YES at step S80), the injection amount changing section 51c proceeds to step S81.

At step S81, the injection amount changing section 51c determines whether the condition (P/L lower limit value Qpmin−Calculation value Q3 Calculation value Q1−F/L lower limit value Qfmin) is satisfied. When this condition is satisfied (YES at step S81), the injection amount changing section 51c proceeds to step S82.

Figure 19:
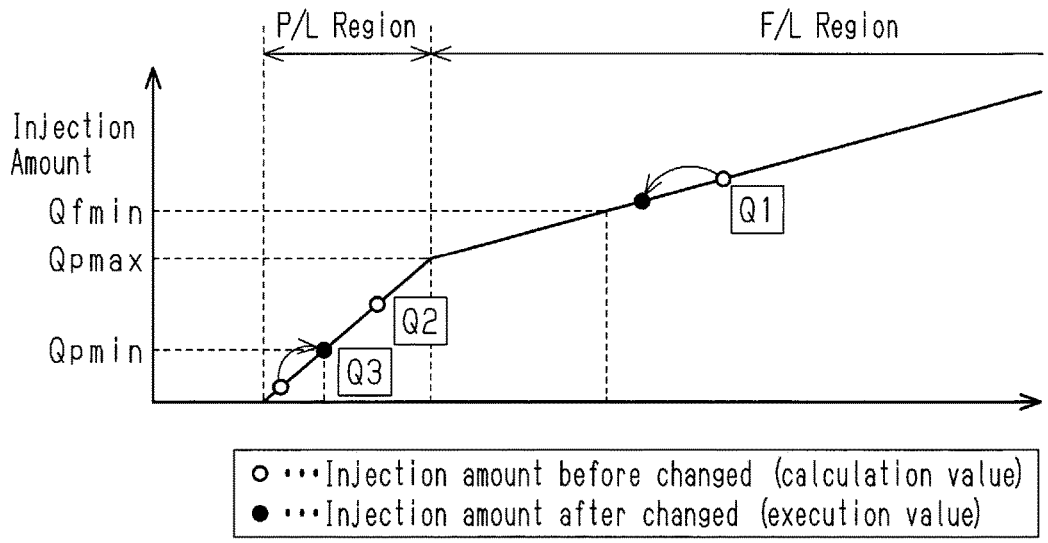
FIG. 19 is an explanatory diagram showing changes in the injection amounts made by the changing process.

When the injection amount changing section 51c has reached step S82, the calculation value Q3 is less the P/L lower limit value Qpmin, at which variation in the injection amount is great, as shown in FIG. 19. In contrast, the calculation value Q2 is within the range not less than the P/L lower limit value Qpmin and not greater than the P/L upper limit value Qpmax, in which variation in the injection amount is small. Further, the calculation value Q1 is not less than the F/L lower limit value Qfmin, at which variation in the injection amount is small. Therefore, at step S82, the injection amount changing section 51c increases the execution value Q3 to the P/L lower limit value Qpmin and sets the execution value of the third fuel injection to the resultant value. In addition, the injection amount changing section 51c sets the execution value of the second fuel injection to the calculation value Q2 without changing it. Further, the injection amount changing section 51c reduces the calculation value Q1 to the value obtained by subtracting the calculation value Q2 and the P/L lower limit value Qpmin from the total injection amount Qt, and sets the execution value of the first fuel injection to the resultant value. That is, the injection amount changing section 51c reduces the calculation value Q1 by the increased amount of the calculation value Q3 and sets the execution value to the resultant value. When the execution value of each fuel injection is set, the injection amount changing process by the injection amount changing section 51c is ended. The process of step S82 corresponds to a first changing process executed by the injection amount changing section 51c.

The execution value (P/L lower limit value Qpmin) of the third fuel injection and the execution value (Q2) of the second fuel injection are both within a range in which variation in the injection amount is small. Further, the difference between the calculation value Q1 and the F/L lower limit value Qfmin is not less than the difference between the P/L lower limit value Qpmin and the calculation value Q3. Therefore, even if the amount by which the calculation value Q3 has been increased is subtracted from the calculation value Q1 to set the execution value of the first fuel injection to the value (Total injection amount Qt−Calculation value Q2−F/L lower limit value Qfmin), the execution value will not become a value that is not less than the P/L lower limit value Qpmin and less than the F/L lower limit value Qfmin, in which variation in the execution value is great. Therefore, the execution values of the first to third fuel injections are set within the range in which variation in the fuel injection is small.

When it is determined at step S81 that the condition (P/L lower limit value Qpmin−Calculation value Q3 Calculation value Q1−F/L lower limit value Qfmin) is not satisfied (NO at step S81), the injection amount changing section 51c proceeds to step S83.

Figure 20:
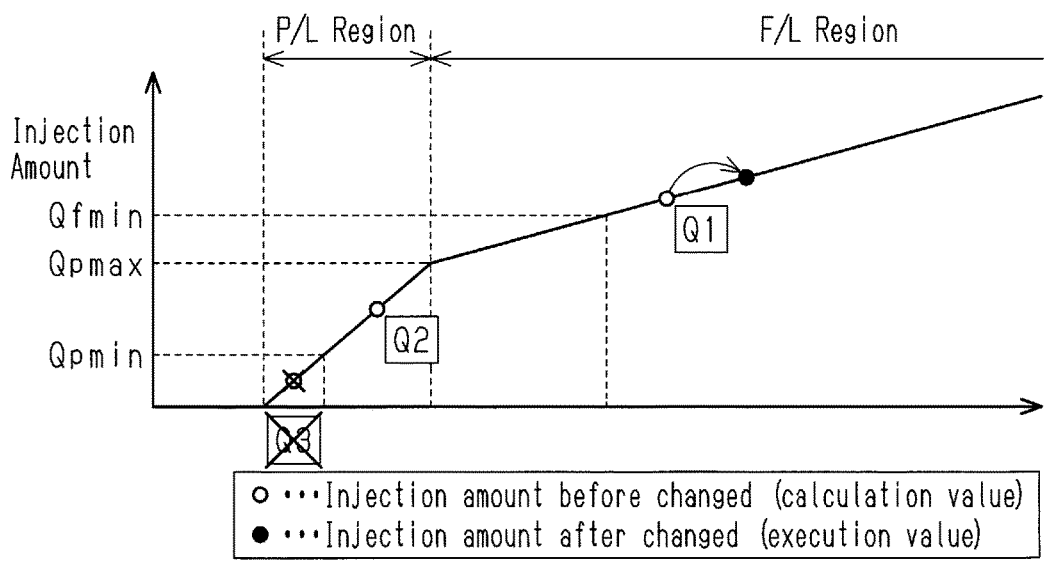
FIG. 20 is an explanatory diagram showing changes in the injection amounts made by the changing process.

When the injection amount changing section 51c has reached step S83, the calculation value Q3 is less the P/L lower limit value Qpmin, at which variation in the injection amount is great, as shown in FIG. 20. The calculation value Q2 is within a range not less than the P/L lower limit value Qpmin and not greater than the P/L upper limit value Qpmax, in which variation in the injection amount is small. Also, although being not less than the F/L lower limit value Qfmin, the calculation value Q1 is relatively close to the F/L lower limit value Qfmin or less than the F/L lower limit value Qfmin. Therefore, at step S83, the injection amount changing section 51c reduces the execution value Q3 to 0 and sets the execution value of the third fuel injection to the reduced value. The injection amount changing section 51c sets the execution value to the calculation value Q2 without changing it. Further, the injection amount changing section 51c increases the calculation value Q1 to the value obtained by subtracting the calculation value Q2 from the total injection amount Qt, and sets the execution value of the first fuel injection to the resultant value. That is, the injection amount changing section 51c increases the calculation value Q1 by the reduced amount of the calculated value Q3 and sets the execution value to the resultant value. When the execution value of each fuel injection is set, the injection amount changing process by the injection amount changing section 51c is ended.

The execution value (Q2) of the second fuel injection is within a range in which variation in the fuel injection is small. In addition, there is a possibility that the execution value of the first fuel injection may be not less than the F/L lower limit value Qfmin, at which variation in the fuel injection is small. Even if the execution value of the first fuel injection is less than the F/L lower limit value Qfmin, variation in the injection amount will be smaller than that of the calculation value Q1 before being changed. Therefore, according to the changing process of step S83, at least variation in the injection amount will be suppressed. At step S83, as the result of setting the execution value of the third fuel injection to 0, the number of times of the fuel injection is changed from 3 to 2.

When it is determined at step S80 that the condition (P/L lower limit value Qpmin≤Calculation value Q2≤P/L upper limit value Qpmax) is not satisfied, that is, when it is determined that the calculation value Q2 is less than the P/L lower limit value Qpmin (NO at step S80), the injection amount changing section 51c proceeds to step S84.

At step S84, the injection amount changing section 51c determines whether the condition ((P/L lower limit value Qpmin−Calculation value Q2)+(P/L lower limit value Qpmin−Calculation value Q3) Calculation value Q1−F/L lower limit value Qfmin) is satisfied. When it is determined that the condition is satisfied (YES at step S84), the injection amount changing section 51c proceeds to step S85.

Figure 21:
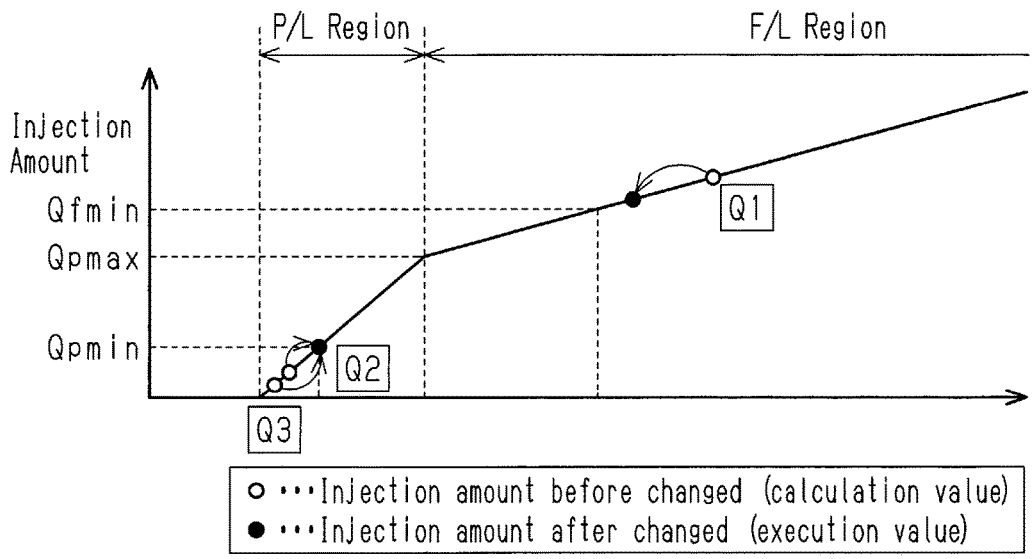
FIG. 21 is an explanatory diagram showing changes in the injection amounts made by the changing process.

When the injection amount changing section 51c has reached step S85, the calculation values Q3, Q2 are both less the P/L lower limit value Qpmin, at which variation in the injection amount is great, as shown in FIG. 21. The calculation value Q3 is not less than the F/L lower limit value Qfmin, at which variation in the injection amount small. Therefore, at step S85, the injection amount changing section 51c increases the execution values Q3, Q2 to the P/L lower limit value Qpmin and sets the execution values of the third and second fuel injections to the resultant values. Also, the injection amount changing section 51c increases the calculation value Q1 to the value obtained by subtracting the doubled P/L lower limit value Qpmin from the total injection amount Qt, and sets the execution value of the first fuel injection to the resultant value. That is, the injection amount changing section 51c reduces the calculation value Q1 by the increased amounts of the calculation values Q3, Q2 and sets the execution values to the resultant value. When the execution value of each fuel injection is set, the injection amount changing process by the injection amount changing section 51c is ended. The process of step S85 corresponds to a first changing process executed by the injection amount changing section 51c.

The execution value (P/L lower limit value Qpmin) of the third and second fuel injections is within a range in which variation in the injection amount is small. The difference between the calculation value Q1 and the F/L lower limit value Qfmin is not less than the value obtained by adding the difference between the P/L lower limit value Qpmin and the calculation value Q2 to the difference between the P/L lower limit value Qpmin and the calculation value Q3. Therefore, even if the amount by which the calculation value Q3 is increased to the P/L lower limit value Qpmin is subtracted from the calculation value Q1, thereby setting the execution value to the value (Total injection amount Qt−(P/L lower limit value Qpmin×2)), the execution value will not fall within a range greater than the P/L upper limit value Qpmax and less than the F/L lower limit value Qfmin, in which variation is great. Therefore, the execution values of the first to third fuel injections are set within the range in which variation in the fuel injection is small.

When it is determined at step S84 that the condition ((P/L lower limit value Qpmin−Calculation value Q2)+(P/L lower limit value Qpmin−Calculation value Q3) s Calculation value Q1−F/L lower limit value Qfmin) is not satisfied (NO at step S84), the injection amount changing section 51c proceeds to step S86.

Figure 22:
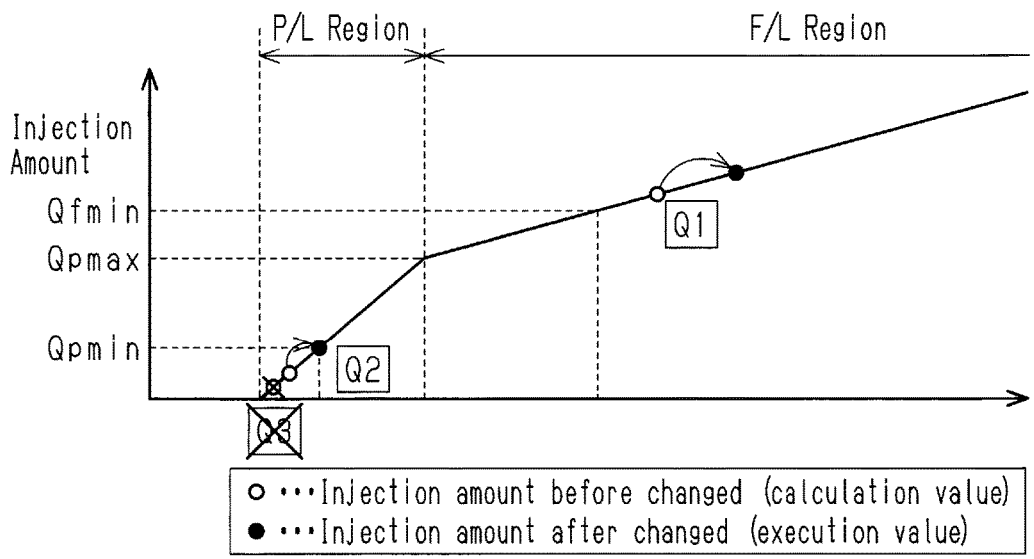
FIG. 22 is an explanatory diagram showing changes in the injection amounts made by the changing process.

When the injection amount changing section 51c has reached step S86, the calculation values Q3, Q2 are both less the P/L lower limit value Qpmin, at which variation in the injection amount is great, as shown in FIG. 22. Also, although being not less than the F/L lower limit value Qfmin, the calculation value Q1 is relatively close to the F/L lower limit value Qfmin or less than the F/L lower limit value Qfmin. Therefore, at step S86, the injection amount changing section 51c reduces the execution value Q3 to 0 and sets the execution value of the third fuel injection to the reduced value. In addition, the injection amount changing section 51c increases the calculation value Q2 to the P/L lower limit value Qpmin, and sets the execution value to the resultant value. Further, the calculation value Q1 is increased to the value obtained by subtracting the calculation value Q2 from the total injection amount Qt, and the execution value of the third fuel injection is set to the resultant value. That is, the injection amount changing section 51c increases the calculation value Q1 by the reduced amount of the calculation value Q3 and subtracts the increased amount of the calculation value Q2 from the calculation value Q1. The injection amount changing section 51c then sets the execution values to the resultant values. When the execution value of each fuel injection is set, the injection amount changing process by the injection amount changing section 51c is ended. Although FIG. 22 shows that the calculation value Q1 is increased, the calculation value Q1 may be reduced as the result of the process at step S86 depending on the values of the calculation values Q2 and Q3.

The execution value (P/L lower limit value Qpmin) of the second fuel injection is within a range in which variation in the fuel injection is small. In addition, the execution value of the first fuel injection may be not less than the F/L lower limit value Qfmin, at which variation in the fuel injection is small. Therefore, according to the changing process of step S83, at least variation in the injection amount at the second fuel injection will be suppressed. At step S83, as the result of setting the execution value of the third fuel injection to 0, the number of times of the fuel injection is changed from 3 to 2.

The operation and advantages of the above-described fuel injection control device 50 will now be described.

In the case where the fuel required for one combustion is divided into three fuel injections and injected as in the case of the fuel injection control device 50 of the present embodiment, the first fuel injection is executed for the purpose of uniformly supplying the fuel to the entire inside of the cylinder 16. The second and third fuel injections are executed for the purpose of forming strata of fuel such that the concentration of fuel increases toward the spark plug in the cylinder 16. Therefore, there is a high possibility that variation in the injection amount will affect the stratification state of the fuel stratum in the cylinder 16 by a greater extent when fuel injection is executed for the second time than for the first time, and for the third time than for the second time. In order to equalize the combustion state of the internal combustion engine 10 for each combustion in each cylinder 16, it is necessary to set the execution value of the third fuel injection to an injection amount with small variation.

In this respect, as shown in FIGS. 14 to 19, and 21, when the calculation value Q3 is less than the P/L lower limit value Qpmin, at which variation is great, the calculation value Q3 is increased to the P/L lower limit value Qpmin, and the execution value of the third fuel injection is set to the resultant value. As shown in FIG. 3, if the execution value of the fuel injection is the P/L lower limit value Qpmin, the variation in the injection amount will be suppressed to be not greater than the allowable value. As a result, it is possible to suppress the occurrence of variation in the combustion state for each cylinder and each combustion.

In addition, the injection ratios R1, R2, and R3 are determined such that fuel strata are properly formed in the cylinder 16 by three fuel injections. Therefore, it is preferable that the execution values be set with minimum changes to the calculation values Q1, Q2, Q3, which are calculated based on the injection ratios R1, R2, R3. In this regard, in the present embodiment, the calculation value Q3 is increased to the P/L lower limit value Qpmin, which is the minimum value capable of suppressing variation to or below the allowable value. Therefore, it is possible to minimize the amount of change in the calculation value Q3 and the amount of the accompanying changes in the calculation values Q2, Q1.

In order to maintain the total injection amount Qt, which is the total amount of fuel required for one combustion, it is necessary to reduce the amount by which the calculation value Q3 is increased in the other calculation values Q1, Q2. Along with changing the calculation values Q1 and Q2, it is desirable to avoid setting the execution values of the first and second fuel injections to injection amounts at which variation is great as much as possible. In this regard, at step S71 shown in FIG. 7, the injection amount changing section 51c of the present embodiment determines whether the condition (P/L lower limit value Qpmin−Calculation value Q3≤Calculation value Q1−F/L lower limit value Qfmin) is satisfied. That is, the injection amount changing section 51c determines whether the amount by which the calculation value Q3 is increased can be covered by the operation value Q1 alone. If the increased amount can be covered by the calculation value Q1 alone, the injection amount changing section 51c reduces only the calculation value Q1 as shown in FIG. 14. Furthermore, even if the amount by which the calculation value Q3 is increased cannot be covered by the calculation value Q1 alone, the injection amount changing section 51c preferentially reduces the calculation value Q1 and then reduces the calculation value Q2 by the remaining amount as shown in FIG. 15. In this manner, the calculation value Q1 of the first fuel injection, which is unlikely to affect the stratification state of fuel strata in the cylinder 16, is reduced preferentially. It is thus possible to suppress the adverse influence such as misfires in the combustion state in the cylinder 16 due to changes in the calculation values Q1, Q2, Q3 of the fuel injections.

In the present embodiment, when the amount by which the calculation value Q3 is increased cannot be covered even by both the calculation value Q1 and the calculation value Q2, the injection amount changing section 51c reduces the calculation value Q2 0 as shown in FIG. 16. That is, the injection amount changing section 51c omits the second fuel injection and executes a total of two fuel injections. Even in this case, the execution value of the third fuel injection (the virtual second fuel injection since the second one has been omitted) is set to the P/L lower limit value Qmin, at which variation in the injection amount is small. Therefore, compared to a case in which the execution value of the third fuel injection is set to an injection amount at which variation in the injection amount is excessively great, it is possible to properly suppress the occurrence of variation in the combustion state in each cylinder 16 for each fuel cycle while reliably executing combustion for each fuel cycle in each cylinder 16.

In the above embodiment, not only the calculation value Q3 but also the calculation value Q2 are calculated as values at which variation in the injection amount is great, in some cases. For example, as shown in FIGS. 12, 13, 17, and 18, the calculation value Q2 may be greater than the P/L upper limit value Qpmax and less than the F/L lower limit value Qfmin in some cases. In this case, in the present embodiment, the injection amount changing section 51c determines whether the amount by which the calculation value Q2 is increased to the F/L lower limit value Qfmin, at which variation in the injection amount is small, can be covered by the calculation value Q1 at step S77 and step S84. When the amount by which the calculation value Q2 is increased can be covered by the calculation value Q1, the injection amount changing section 51c reduces only the calculation value Q1 as shown in FIGS. 12 and 17. In this manner, the calculation value Q1 of the first fuel injection, which is unlikely to affect the stratification state of fuel strata in the cylinder 16, is reduced. It is thus possible to suppress the adverse influence such as misfires in the combustion state in the cylinder 16 due to changes in the calculation values Q1, Q2, Q3 of the fuel injections. When the amount by which the calculation value Q2 is increased cannot be covered by the calculation value Q1, the injection amount changing section 51c reduces the calculation value Q2 to 0 as shown in FIGS. 13 and 18. That is, the injection amount changing section 51c omits the second fuel injection and executes a total of two fuel injections. Even in this case, the execution value of the third fuel injection (the virtual second fuel injection since the second one has been omitted) is set to the P/L lower limit value Qmin, at which variation in the injection amount is small. Therefore, an adequate combustion state of the internal combustion engine 10 can be achieved as compared with the case where the execution value of the third fuel injection is set to an injection amount at which variation in the injection amount is excessively great.

Further, cases in which a value at which variation in the injection amount is great is calculated as the calculation value Q2, for example, include a case in which the calculation value Q2 is less than the P/L lower limit value Qpmin as shown in FIGS. 21 and 22. In this case, in the present embodiment, the injection amount changing section 51c determines whether the amount by which the calculation value Q2 is increased to the P/L lower limit value Qpmin, at which variation in the injection amount is small, can be covered by the calculation value Q1 at step S84. When the amount by which the calculation value Q2 is increased can be covered by the calculation value Q1, the injection amount changing section 51c reduces only the calculation value Q1 as shown in FIG. 21. In this manner, the calculation value Q1 of the first fuel injection, which is unlikely to affect the stratification state of fuel strata in the cylinder 16, is reduced. It is thus possible to suppress the adverse influence such as misfires in the combustion state in the cylinder 16 due to changes in the calculation values Q1, Q2, Q3 of the fuel injections. When the amount by which the calculation value Q2 is increased cannot be covered by the calculation value Q1, the injection amount changing section 51c reduces the calculation value Q3 to 0 as shown in FIG. 22. That is, the injection amount changing section 51c omits the third fuel injection and executes a total of two fuel injections. Even in this case, the execution value of the second fuel injection is set to the P/L lower limit value Qpmin, at which variation in the injection amount is small. This prevents the sum of the fuel injection amounts at the first and second fuel injections from deviating from the total injection amount Qt calculated by the total injection amount calculation section 51a. Furthermore, compared with, for example, a case where the second fuel injection is omitted instead of the third fuel injection, it only requires a small amount of change to change the injection amount to a value at which variation in the injection amount is small.

Also, in some cases, the calculation value Q2 is set to a value in a range not less than the P/L lower limit value Qpmin and not greater than the P/L upper limit value Qpmax, in which variation in the fuel injection is small. In such a case, as shown in FIG. 20, the injection amount changing section 51c reduces the calculation value Q3 to zero when the calculation value Q3 is less than the P/L lower limit value Qpmin, at which variation in the injection amount is great. That is, the injection amount changing section 51c omits the third fuel injection and executes a total of two fuel injections. In this case, the execution value of the second fuel injection is set to a value in the range not less than the P/L lower limit value Qpmin and not greater than the P/L upper limit value Qpmax, in which variation in the injection amount is small. This prevents the sum of the fuel injection amounts at the first and second fuel injections from deviating from the total injection amount Qt calculated by the total injection amount calculation section 51a.

Since the injection ratio R1 is set to an appropriately great value, the calculation value Q1 never drops to or below the P/L upper limit value Qpmax. Nonetheless, as shown in FIG. 11, there is a possibility that a value that is greater than the P/L upper limit value Qpmax, at which variation in fuel injection is great, and less than the F/L lower limit value Qfmin will be calculated as the operation value Q1. In this case, in the present embodiment, the injection amount changing section 51c reduces the calculation value Q3 to the P/L lower limit value Qpmin, which is the minimum injection amount that allows variation in the injection amount to be not greater than the allowable value. In addition, the injection amount changing section 51c reduces the calculation value Q2 to 0 to omit the second fuel injection. As described above, the injection amount changing section 51c may be able to reduce the calculation values Q3 and Q2 as much as possible, and increase the calculation value Q1 by the reduced amount of the calculation values Q3, Q2, thereby setting the execution value of the first fuel injection to a value not less than the F/L lower limit value Qfmin, at which variation in the injection amount is small.

The above-described embodiment may be modified as follows.

The configuration of the internal combustion engine 10, to which the fuel injection control device 50 is adapted, is not limited to the example of the above-described embodiment. For example, a part of the configuration such as the exhaust purification catalyst 20 or the like may be omitted, or a device not provided in the above embodiment such as a forced-induction device may be provided.

In the above-described embodiment, the injection ratio R1 is determined such that the calculation value Q1 is greater than the P/L upper limit value Qpmax even when the total injection amount Qt is small. However, the present invention is not limited to this. That is, in the above-described embodiment, the first fuel injection of the three fuel injections is executed by the full-lift injection, but all of the three injections may be executed by the partial-lift injection. If the final fuel injection of a plurality of fuel injections is executed by the partial-lift injection, the technique of the above-described embodiment may be employed, in which, when the calculation value of the final fuel injection is less than the P/L lower limit value Qpmin, the calculation value is increased to a value not less than the P/L lower limit value Qpmin.

The P/L lower limit value Qpmin, the P/L upper limit value Qpmax, and the F/L lower limit value Qfmin do not always have to be constant values. Depending on the operating state of the internal combustion engine 10, allowable values of variations in the injection amount may change. Therefore, any or all of the P/L lower limit value Qpmin, the P/L upper limit value Qpmax, and the F/L lower limit value Qfmin may be variable in accordance with the operating state of the internal combustion engine 10. Even if the respective values of the P/L lower limit value Qpmin, the P/L upper limit value Qpmax, and the F/L lower limit value Qfmin are variable, it can be said that each value is a predetermined value as long as the relationship (map and calculation formula) with the operating state of the internal combustion engine 10 is stored in the memory such as the ROM 52 of the fuel injection control device 50.

In the above-described embodiment, the number of times fuel required for one combustion is divided and injected is generally set to three times, but the number of times of injection may be two or more than three. When the number of times of fuel injections is set to two, there is no fuel injection corresponding to the specific fuel injection. Further, when the number of times of fuel injection is four, the second and third fuel injections each correspond to the specific fuel injection. When there are two or more specific fuel injections, there may be cases where the specific fuel injections are all within the range greater than the P/L upper limit value Qpmax and less than the F/L lower limit value Qfmin. In this case, the process of increasing or reducing the specific fuel injection may be executed for at least one of the plurality of the specific fuel injections. Further, in the case of increasing or reducing a plurality of specific fuel injections, the value after increasing or reducing may be different for each of the specific fuel injections.

In the above-described embodiment, the fuel injection control device 50 is configured as an electronic control unit of the vehicle, but it is not limited thereto. For example, the fuel injection control device 50 may be configured as a computer (control chip) separate from the electronic control unit of the vehicle.

In the above-described embodiment, the series of control by the fuel injection control device 50 is executed at the time of starting the internal combustion engine 10, but it may be executed in other situations. If the series of control by the fuel injection control device 50 is to be executed in situations other than the time of starting the internal combustion engine 10, the process of steps S41 to S43 shown in FIG. 4 can be omitted.

The process of the total injection amount calculation section 51a in the fuel injection control device 50, that is, the process of calculating the total injection amount Qt is not limited to the example of the above-described embodiment. In the case where the exhaust purification catalyst 20 is omitted as in the above-described modification, the calculation using the warm-up increase factor K1 and the attenuation factor K2 is unnecessary. Further, the total injection amount Qt may be calculated using parameters such as factors and correction values in addition to the warm-up increase factor K1 and the attenuation factor K2.

The process of the individual injection amount calculation section 51b in the fuel injection control device 50, that is, the process of calculating the calculation values Q1, Q2, Q3 is not limited to the example of the above-described embodiment. For example, the calculation values Q1, Q2, Q3 may be calculated by substituting various parameters indicating the operation state of the internal combustion engine 10 into a predetermined arithmetic expression.

Figure 23:
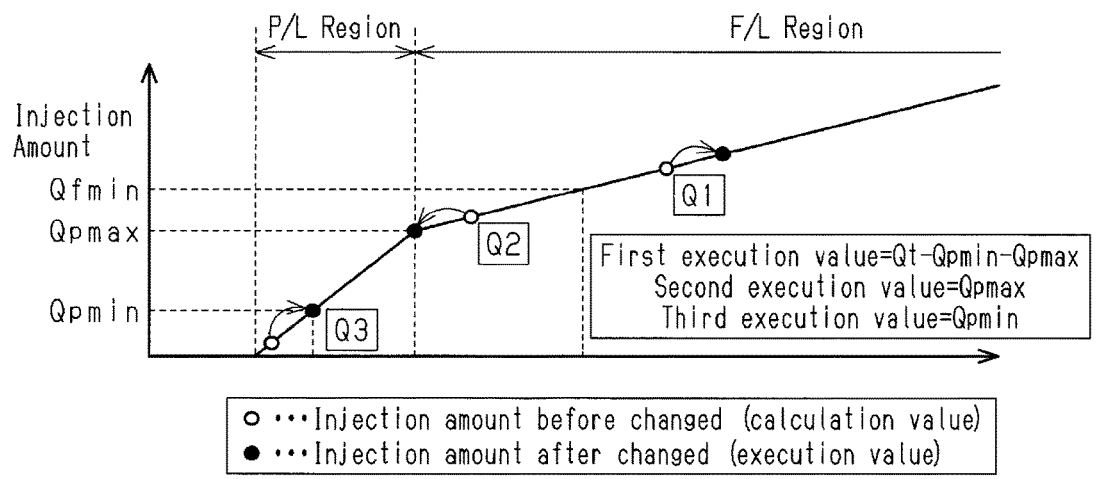
FIG. 23 is an explanatory diagram showing changes in each injection amount made by a changing process applicable in place of the changing process shown in FIG. 18.

Step S79 shown in FIG. 7 may be replaced by another step. At step S79 in the above-described embodiment, the calculation value Q2 is reduced to 0 to omit the second fuel injection as shown in FIG. 18, so that the number of times of fuel injection is twice. If it is not appropriate to reduce the number of fuel injections, the calculation value Q2 does not need to be reduced to 0. Instead, as shown in FIG. 23, the calculation value Q2 may be reduced to the P/L upper limit value Qpmax. With this modification, the injection amount in the second fuel injection is reduced and the second fuel injection, which was supposed to be injected in the full-lift injection, is executed by the partial-lift injection, but the number of fuel injections itself is not reduced. In this modification, the execution value of the first fuel injection is set to the value obtained by subtracting the P/L lower limit value Qpmin and the P/L upper limit value Qpmax from the total injection quantity Qt.

Furthermore, in the above modification, the calculation value Q2 does not need to be reduced to the P/L upper limit value Qpmax. Specifically, the calculation value Q2 may be any value as long as it is within the range not less than the P/L lower limit value Qpmin and not greater than the P/L upper limit value Qpmax. The processes of these modifications correspond to the first and fourth changing processes executed by the injection amount changing section 51c.

Regardless of the value of the calculation value Q1, the amounts by which the calculation values Q3, Q2 are increased may always be subtracted from the calculation value Q1, if variation in the injection amount in the first fuel injection is allowed to be increased. More specifically, step S67 shown in FIG. 6 may be omitted, and the injection amount changing section 51c may be shifted directly from step S63 to step S68. The same applies to steps S71, S77, S81, and S84.

In the above-described embodiment, the calculation value Q3 is increased to the P/L lower limit value Qpmin. However, the calculation value Q3 may be increased to any value as long as that value is within a range not less than the P/L lower limit value Qpmin and not greater than the P/L upper limit value Qpmax. When the execution value of the third fuel injection is the P/L lower limit value Qpmin, variation in the injection amount is suppressed to be not greater than the allowable value. However, there may be injection amounts that can further reduce variations in the injection amount within the range not less than the P/L lower limit value Qpmin and not greater than the P/L upper limit value Qpmax. If the execution value of the third fuel injection is desired to further reduce variation, a value other than the P/L lower limit value Qpmin may be employed.

In the above-described embodiment, the calculation value Q2, which is within the range greater than the P/L upper limit value Qpmax and less than the F/L lower limit value Qfmin, is increased to the F/L lower limit value Qfmin. However, the present invention is not limited thereto. Any value can be used as long as the calculation value Q2 (the execution value) after being increased is a value not less than the F/L lower limit value Qfmin.

Likewise, when reducing the calculation value Q2, which is within the range greater than the P/L upper limit value Qpmax and less than the F/L lower limit value Qfmin to a value not less than the P/L lower limit value Qpmin and not greater than the P/L upper limit value Qpmax, any value is acceptable as long as the calculation value Q2 (the execution value) after being reduced is not less than the P/L lower limit value Qpmin and not greater than the P/L upper limit value Qpmax.

In a case in which the calculation value Q3 is less than the P/L lower limit value Qpmin, at which variation in the injection amount is great, if the calculation value Q3 can be increased to a value not less than the P/L lower limit value Qpmin and not greater than the P/L upper limit value Qpmax, other processes can be omitted. For example, when it is determined at step S60 shown in FIG. 6 that the calculation value Q3 is less than the P/L lower limit value Qpmin (NO at step S60), the process at step S72 shown in FIG. 7 may be executed, and the other steps may be omitted. In the case of this modification, the execution values of the first and second fuel injections may be set to values at which variation in the injection amount is great. However, the execution value of the third fuel injection, which is the final fuel injection, is set to an injection amount at which variation is small. Therefore, it is possible to suppress variation in the combustion state in each cylinder and each combustion cycle due to variation in the third fuel injection.

In the case of reducing the calculation value Q3 of the third fuel injection to 0 as in step S83 (see FIG. 20) and step S86 (see FIG. 22) of the above-described embodiment, the injection timing of the second fuel injection may be changed. When the third fuel injection is omitted, the second fuel injection virtually functions as the final fuel injection. The timing of the second fuel injection is earlier than the timing of the injection timing. Therefore, even if strata of fuel are formed at the second fuel injection, the fuel may fail to sufficiently diffuse by the timing of fuel ignition so that the expected stratification state of the fuel stratum cannot be maintained. Therefore, it is preferable to make it easier to maintain the fuel strata formed by the second fuel injection until the ignition timing by delaying the injection timing of the second fuel injection.

The fuel injection control device 50 is not limited to a device that includes a central processing unit and a memory and executes all of various processes through software. For example, the fuel injection control device 50 may include dedicated hardware (an application specific integrated circuit: ASIC) that executes at least part of the various processes. The fuel injection control device 50 may be circuitry including 1) one or more dedicated hardware circuits such as an ASIC, 2) one or more processors (microcomputers) that operate according to a computer program (software), or 3) a combination thereof.

The invention claimed is:

1. A fuel injection control device adapted to an internal combustion engine, wherein
the internal combustion engine is configured to execute a full-lift injection, in which a needle valve of a direct injector that injects fuel is fully opened, and a partial-lift injection, in which the needle valve of the direct injector is not fully opened,
the fuel injection control device is configured to divide an amount of fuel corresponding to an injection amount required for a single combustion into portions corresponding to multiple fuel injections, cause the direct injector to inject the fuel multiple times, and cause the direct injector to execute the partial-lift injection as a final fuel injection of the multiple fuel injections,
the fuel injection control device comprises:
a total injection amount calculation section, which is configured to calculate a total amount of injection amounts at the multiple fuel injections as a total injection amount;
an individual injection amount calculation section, which is configured to calculate the injection amount at each fuel injection such that a sum of the injection amounts at the multiple fuel injections is equal to the total injection amount calculated by the total injection amount calculation section; and
an injection amount changing section, which is configured to execute a first changing process when an injection amount at the final fuel injection of the multiple fuel injections is less than a predetermined partial-lift injection lower limit value, and
the injection amount changing section is configured to execute, as the first changing process, a process for increasing the injection amount at the final fuel injection to a value that is not less than the partial-lift injection lower limit value and not greater than a partial-lift injection upper limit value, which is set to be greater than the partial-lift injection lower limit value, and reducing an injection amount at a fuel injection other than the final fuel injection of the multiple fuel injections by the increased amount of the injection amount at the final fuel injection, wherein
the fuel injection control device is configured to cause the direct injector to execute the full-lift injection as an initial fuel injection of the multiple fuel injections, and
the injection amount changing section is configured to execute, in the first changing process, a process for reducing an injection amount at the initial fuel injection by the increased amount at the final fuel injection.

2. The fuel injection control device according to claim 1, wherein the injection amount changing section is configured to execute, in the first changing process, a process for increasing the injection amount at the final fuel injection, which is calculated by the individual injection amount calculation section, to a value equal to the partial-lift injection lower limit value.

3. A fuel injection control device adapted to an internal combustion engine, wherein
the internal combustion engine is configured to execute a full-lift injection, in which a needle valve of a direct injector that injects fuel is fully opened, and a partial-lift injection, in which the needle valve of the direct injector is not fully opened,
the fuel injection control device is configured to divide an amount of fuel corresponding to an injection amount required for a single combustion into portions corresponding to multiple fuel injections, cause the direct injector to inject the fuel multiple times, and cause the direct injector to execute the partial-lift injection as a final fuel injection of the multiple fuel injections,
the fuel injection control device comprises:
a total injection amount calculation section, which is configured to calculate a total amount of injection amounts at the multiple fuel injections as a total injection amount;
an individual injection amount calculation section, which is configured to calculate the injection amount at each fuel injection such that a sum of the injection amounts at the multiple fuel injections is equal to the total injection amount calculated by the total injection amount calculation section; and
an injection amount changing section, which is configured to execute a first changing process when an injection amount at the final fuel injection of the multiple fuel injections is less than a predetermined partial-lift injection lower limit value, and
the injection amount changing section is configured to execute, as the first changing process, a process for increasing the injection amount at the final fuel injection to a value that is not less than the partial-lift injection lower limit value and not greater than a partial-lift injection upper limit value, which is set to be greater than the partial-lift injection lower limit value, and reducing an injection amount at a fuel injection other than the final fuel injection of the multiple fuel injections by the increased amount of the injection amount at the final fuel injection, wherein among the multiple fuel injections, a fuel injection other than the final fuel injection and an initial fuel injection is defined as a specific fuel injection, the injection amount changing section is configured to execute a second changing process when an injection amount at the initial fuel injection of the multiple fuel injections, which are calculated by the individual injection amount calculation section, is not less than a full-lift injection lower limit value, which is set to be greater than the partial-lift injection upper limit value, and an injection amount at the specific fuel injection of the injection amounts at the multiple fuel injections, which are calculated by the individual injection amount calculation section, is greater than the partial-lift injection upper limit value and less than the full-lift injection lower limit value, and the injection amount changing section is configured to execute, as the second changing process, a process for increasing the injection amount at the specific fuel injection to a value that is not less than the full-lift injection lower limit value and reducing the injection amount at the initial fuel injection by the increased amount of the injection amount at the specific fuel injection.

4. A fuel injection control device adapted to an internal combustion engine, wherein the internal combustion engine is configured to execute a full-lift injection, in which a needle valve of a direct injector that injects fuel is fully opened, and a partial-lift injection, in which the needle valve of the direct injector is not fully opened, the fuel injection control device is configured to divide an amount of fuel corresponding to an injection amount required for a single combustion into portions corresponding to multiple fuel injections, cause the direct injector to inject the fuel multiple times, and cause the direct injector to execute the partial-lift injection as a final fuel injection of the multiple fuel injections, the fuel injection control device comprises:
a total injection amount calculation section, which is configured to calculate a total amount of injection amounts at the multiple fuel injections as a total injection amount;
an individual injection amount calculation section, which is configured to calculate the injection amount at each fuel injection such that a sum of the injection amounts at the multiple fuel injections is equal to the total injection amount calculated by the total injection amount calculation section; and
an injection amount changing section, which is configured to execute a first changing process when an injection amount at the final fuel injection of the multiple fuel injections is less than a predetermined partial-lift injection lower limit value, and the injection amount changing section is configured to execute, as the first changing process, a process for increasing the injection amount at the final fuel injection to a value that is not less than the partial-lift injection lower limit value and not greater than a partial-lift injection upper limit value, which is set to be greater than the partial-lift injection lower limit value, and reducing an injection amount at a fuel injection other than the final fuel injection of the multiple fuel injections by the increased amount of the injection amount at the final fuel injection, wherein among the multiple fuel injections, a fuel injection other than the final fuel injection and an initial fuel injection is defined as a specific fuel injection, the injection amount changing section is configured to execute a third changing process when an injection amount at the initial fuel injection of the multiple fuel injections, which are calculated by the individual injection amount calculation section, is not less than a full-lift injection lower limit value, which is set to be greater than the partial-lift injection upper limit value, and an injection amount at the specific fuel injection of the injection amounts at the multiple fuel injections, which are calculated by the individual injection amount calculation section, is greater than the partial-lift injection upper limit value and less than the full-lift injection lower limit value, and the injection amount changing section is configured to execute, as the third changing process, a process for reducing the injection amount at the specific fuel injection to 0 and increasing the injection amount at the initial fuel injection by the reduced amount of the injection amount at the specific fuel injection.

5. A fuel injection control device adapted to an internal combustion engine, wherein the internal combustion engine is configured to execute a full-lift injection, in which a needle valve of a direct injector that injects fuel is fully opened, and a partial-lift injection, in which the needle valve of the direct injector is not fully opened, the fuel injection control device is configured to divide an amount of fuel corresponding to an injection amount required for a single combustion into portions corresponding to multiple fuel injections, cause the direct injector to inject the fuel multiple times, and cause the direct injector to execute the partial-lift injection as a final fuel injection of the multiple fuel injections, the fuel injection control device comprises:
a total injection amount calculation section, which is configured to calculate a total amount of injection amounts at the multiple fuel injections as a total injection amount;
an individual injection amount calculation section, which is configured to calculate the injection amount at each fuel injection such that a sum of the injection amounts at the multiple fuel injections is equal to the total injection amount calculated by the total injection amount calculation section; and
an injection amount changing section, which is configured to execute a first changing process when an injection amount at the final fuel injection of the multiple fuel injections is less than a predetermined partial-lift injection lower limit value, and the injection amount changing section is configured to execute, as the first changing process, a process for increasing the injection amount at the final fuel injection to a value that is not less than the partial-lift injection lower limit value and not greater than a partial-lift injection upper limit value, which is set to be greater than the partial-lift injection lower limit value, and reducing an injection amount at a fuel injection other than the final fuel injection of the multiple fuel injections by the increased amount of the injection amount at the final fuel injection, wherein among the multiple fuel injections, a fuel injection other than the final fuel injection and an initial fuel injection is defined as a specific fuel injection, the injection amount changing section is configured to execute a fourth changing process when an injection amount at the initial fuel injection of the multiple fuel injections, which are calculated by the individual injection amount calculation section, is not less than a full-lift injection lower limit value, which is set to be greater than the partial-lift injection upper limit value, and an injection amount at the specific fuel injection of the injection amounts at the multiple fuel injections, which are calculated by the individual injection amount calculation section, is greater than the partial-lift injection upper limit value and less than the full-lift injection lower limit value, and the injection amount changing section is configured to execute, as the fourth changing process, a process for reducing the injection amount at the specific fuel injection to a value that is not less than the partial-lift injection lower limit value and not greater than the partial-lift injection upper limit value and increasing the injection amount at the initial fuel injection by the reduced amount of the injection amount at the specific fuel injection.

* * * * *